US011983440B2

(12) United States Patent
Kim et al.

(10) Patent No.: US 11,983,440 B2
(45) Date of Patent: *May 14, 2024

(54) STORAGE DEVICE INCLUDING MEMORY CONTROLLER IMPLEMENTING JOURNALING AND OPERATING METHOD OF THE MEMORY CONTROLLER

(71) Applicant: Samsung Electronics Co., Ltd., Suwon-si (KR)

(72) Inventors: Huijeong Kim, Yongin si (KR); Cheolho Kang, Hwaseong si (KR); Duckho Bae, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 54 days.

This patent is subject to a terminal disclaimer.

(21) Appl. No.: 17/470,720

(22) Filed: Sep. 9, 2021

(65) Prior Publication Data
US 2022/0206713 A1 Jun. 30, 2022

(30) Foreign Application Priority Data

Dec. 30, 2020 (KR) .................. 10-2020-0188208
Mar. 17, 2021 (KR) .................. 10-2021-0034866

(51) Int. Cl.
*G06F 3/06* (2006.01)
*G06F 11/10* (2006.01)
*G06F 12/10* (2016.01)

(52) U.S. Cl.
CPC .......... *G06F 3/0659* (2013.01); *G06F 3/0604* (2013.01); *G06F 3/064* (2013.01);
(Continued)

(58) Field of Classification Search
CPC .... G06F 12/10; G06F 11/1004; G06F 3/0656; G06F 3/0659; G06F 3/0604; G06F 3/064;
(Continued)

(56) References Cited

U.S. PATENT DOCUMENTS 5,745,671 A * 4/1998 Hodges .............. G11B 20/1833
714/6.21
7,139,927 B2 11/2006 Park et al.
(Continued)

FOREIGN PATENT DOCUMENTS

JP 4362839 B1 11/2009
KR 100453228 B1 10/2004
(Continued)

OTHER PUBLICATIONS

Extended European Search Report dated Apr. 25, 2022 for corresponding EP Patent Application No. 21206530.4.

*Primary Examiner* — Sanjiv Shah
*Assistant Examiner* — Edward Waddy, Jr.
(74) *Attorney, Agent, or Firm* — Muir Patent Law, PLLC

(57) ABSTRACT

A storage device including a memory controller and an operating method of the memory controller are provided. The storage device includes a non-volatile memory device including a write buffer configured to store write data provided from a host and a journal buffer configured to store a journal log, a volatile memory device configured to temporarily store metadata, and a memory controller configured to provide the non-volatile memory device with a journaling command, that includes the journal log and the physical address corresponding to the journal buffer, and which issues a command to store the journal log in the journal buffer, to update the metadata temporarily stored in the volatile memory device, and to control the volatile memory device to store updated metadata to the non-volatile memory device.

19 Claims, 15 Drawing Sheets

(52) U.S. Cl.
CPC ............ *G06F 3/0656* (2013.01); *G06F 3/068* (2013.01); *G06F 11/1004* (2013.01); *G06F 12/10* (2013.01); *G06F 2212/657* (2013.01)

(58) Field of Classification Search
CPC ............. G06F 3/068; G06F 2212/7203; G06F 12/0246; G06F 3/0679; G06F 3/061
USPC ......... 711/102, 103, E12.001, E12.008, 205, 711/206, 207
See application file for complete search history.

(56) References Cited

U.S. PATENT DOCUMENTS

| | | | | |
|---|---|---|---|---|
| 9,081,701 | B1* | 7/2015 | Northcott | ................ G06F 11/08 |
| 9,830,257 | B1 | 11/2017 | Booth et al. | |
| 10,254,983 | B2 | 4/2019 | Tomlin et al. | |
| 10,733,098 | B2 | 8/2020 | Sundrani et al. | |
| 2011/0060864 | A1* | 3/2011 | Yoshii | ..................... G06F 3/061 |
| | | | | 711/E12.001 |
| 2014/0214766 | A1* | 7/2014 | Kato | ................... G06F 11/1471 |
| | | | | 707/640 |
| 2016/0371145 | A1* | 12/2016 | Akutsu | ................... G06F 3/067 |
| 2017/0293536 | A1 | 10/2017 | Won et al. | |
| 2019/0155792 | A1 | 5/2019 | Jeong et al. | |
| 2019/0220443 | A1* | 7/2019 | Wang | ................... G06F 16/116 |
| 2019/0236004 | A1* | 8/2019 | Bernat | ................ G06F 12/0811 |
| 2020/0242021 | A1* | 7/2020 | Gholamipour | ...... G06F 11/1456 |
| 2020/0285551 | A1* | 9/2020 | Fujii | ................... G06F 11/1076 |
| 2021/0056000 | A1* | 2/2021 | Rostagni | ............. G06F 11/0793 |
| 2021/0157514 | A1* | 5/2021 | Koo | ...................... G06F 12/128 |

FOREIGN PATENT DOCUMENTS

| | | |
|---|---|---|
| KR | 101474843 B1 | 12/2014 |
| KR | 101541532 B1 | 8/2015 |
| KR | 101765517 B1 | 8/2017 |
| KR | 1020170136366 A | 12/2017 |
| KR | 1020190067147 A | 6/2019 |

* cited by examiner

STORAGE DEVICE INCLUDING MEMORY CONTROLLER IMPLEMENTING JOURNALING AND OPERATING METHOD OF THE MEMORY CONTROLLER

CROSS-REFERENCE TO RELATED APPLICATIONS

This application is based on and claims priority under 35 U.S.C. § 119 to Korean Patent Application Nos. 10-2020-0188208, filed on Dec. 30, 2020 and 10-2021-0034866, filed on Mar. 17, 2021, in the Korean Intellectual Property Office, the disclosures of which are incorporated by reference herein in their entirety.

BACKGROUND

Aspects of the inventive concept relate to an electronic device, and more particularly, to a storage device including a memory controller and an operating method of the memory controller.

Electronic devices, such as smartphones, tablet computers, and computers, may store various pieces of data so as to provide various user experiences. In order to manage various pieces of data, electronic devices may include a storage device which stores data on the basis of control by a host. The storage device may include a memory device storing data and a memory controller controlling the memory device. The memory device may be categorized as one of a volatile memory and a non-volatile memory.

In performing an operation of an electronic device, when power is unexpectedly cut off or kernel panic, application crash, or system crash occurs, some pieces of data of a storage device may be damaged. In order to solve such a problem, electronic devices may implement journaling. Journaling is technology for logging changes in a memory to trace the changes before the changes are reflected in a storage device.

SUMMARY

Aspects of the inventive concept provide a storage device and an operating method of a memory controller, which ensure consistency between metadata and a journal log even when an unexpected event such as sudden power off or kernel panic, application crash, or system crash occurs.

Aspects of the inventive concept provide a storage device and an operating method of a memory controller, which minimize a reduction in performance caused by journaling and decrease power unnecessarily consumed by the storage device.

According to an aspect of the inventive concept, there is provided a storage device including a non-volatile memory device including a write buffer configured to store write data provided from a host and a journal buffer configured to store a journal log, the journal log being data representing update information indicating mapping information of a physical address and a logical address provided from the host, a volatile memory device configured to temporarily store metadata, and a memory controller configured to provide the non-volatile memory device with a journaling command, that includes the journal log and the physical address corresponding to the journal buffer, and which issues a command to store the journal log in the journal buffer, to update the metadata temporarily stored in the volatile memory device, and to control the volatile memory device to store updated metadata to the non-volatile memory device.

According to another aspect of the inventive concept, there is provided a storage device including a non-volatile storage device including a first memory region configured to store write data provided from a host, a second memory region configured to store a journal log, and a third memory region configured to store metadata of the write data, the journal log being data representing update information indicating mapping information of a physical address of the first memory region and a logical address provided from the host, a volatile memory device configured to temporarily store the metadata, and a memory controller configured to provide the non-volatile storage device with a first journaling command, that includes the journal log and the physical address corresponding to the second memory region, and which issues a command to store the journal log, to update the metadata temporarily stored in the volatile memory device, and to control the volatile memory device to store updated metadata to the non-volatile storage device.

According to another aspect of the inventive concept, there is provided an operating method of a memory controller included in a storage device having a non-volatile storage device, the operating method including receiving first metadata and a journal log stored in the non-volatile storage device in response to power, from outside of the storage device, supplied to the storage device, the journal log being data representing update information indicating mapping information of a logical address provided from a host and a physical address of a memory block storing write data among a plurality of memory blocks included in the non-volatile storage device, generating second metadata including map data representing the mapping information and allocation data representing information indicating an allocated memory region in the non-volatile storage device, on the basis of the journal log, and providing the non-volatile storage device with a write command that includes a command to store the second metadata, a physical address of a memory block storing metadata among the plurality of memory blocks, and the second metadata.

BRIEF DESCRIPTION OF THE DRAWINGS

Embodiments of the inventive concept will be more clearly understood from the following detailed description taken in conjunction with the accompanying drawings in which.

DETAILED DESCRIPTION OF THE EMBODIMENTS

Hereinafter, embodiments will be described in detail with reference to the accompanying drawings.

Figure 1:
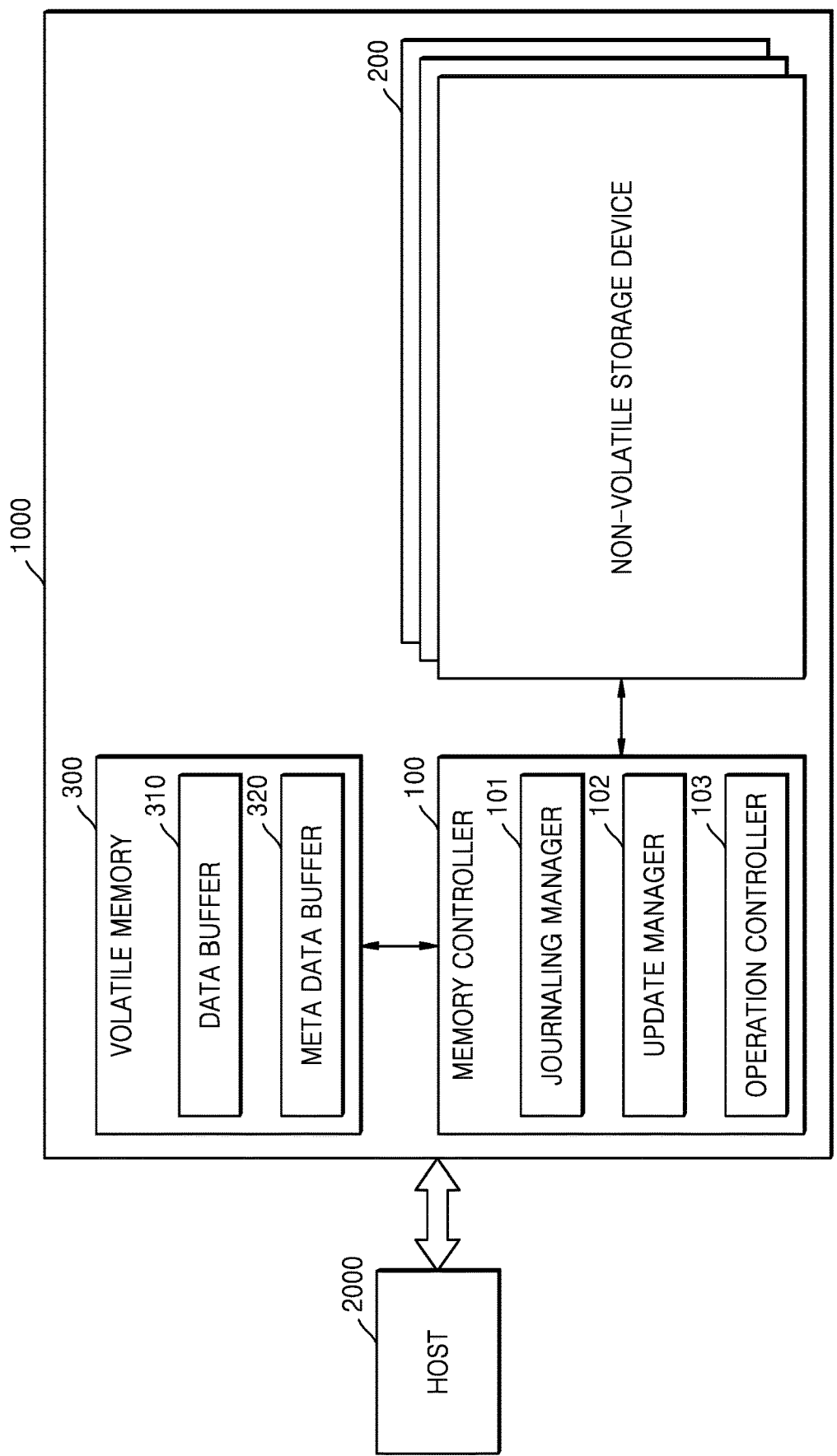
FIG. 1 is a diagram for describing a storage system according to an embodiment.

FIG. 1 is a diagram for describing a storage system according to an embodiment.

Referring to FIG. 1, the storage system may include a storage device 1000 and a host 2000.

The storage device 1000 may be a device which stores data on the basis of a request of the host 2000. The storage device 1000 may include a memory controller 100, a non-volatile storage device 200, and a volatile memory device 300.

The memory controller 100 may control an overall operation of the storage device 1000. When power is applied to the storage device 1000 from outside of the storage device 1000, the memory controller 100 may execute a storage operating system stored in the non-volatile storage device 200.

The memory controller 100 may be implemented with a processor. The memory controller 100 implemented with a processor may perform an error correction encoding operation on data provided to the non-volatile storage device 200 to generate data to which a parity bit is added. The parity bit (not shown) may be stored in the non-volatile storage device 200. The memory controller 100 may calculate an error correction code value of data, which is to be programmed in the non-volatile storage device 200, in a program operation. The memory controller 100 may perform error correction decoding on data output from the non-volatile storage device 200, and in this case, may correct an error by using a parity bit. The memory controller 100 may perform an error correction operation on data read from the non-volatile storage device 200 on the basis of the error correction code value in a read operation. The memory controller 100 may perform an error correction operation on data restored from the non-volatile storage device 200 in a rebuild operation performed on failed data.

The memory controller 100 may control the non-volatile storage device 200 or the volatile memory device 300 to perform each of a program operation (or a write operation), a read operation, and an erase operation in response to a write request, a read request, and an erase request of the host 2000.

In the program operation, the memory controller 100 may provide a program command, a physical address, and write data to the non-volatile storage device 200.

In an embodiment, in the program operation, the memory controller 100 may provide the program command and the physical address to the non-volatile storage device 200. Also, the memory controller 100 may provide a flush command and an address to the volatile memory device 300 to flush (i.e., move) data, temporarily stored in the volatile memory device 300, to the non-volatile storage device 200. When the data temporarily stored in the volatile memory device 300 is provided to the non-volatile storage device 200, the data temporarily stored in the volatile memory device 300 may be released.

In the read operation, the memory controller 100 may provide a read command and a physical address to the non-volatile storage device 200.

In the erase operation, the memory controller 100 may provide a trim command and a physical address to the non-volatile storage device 200.

The memory controller 100 may transfer a command, an address, and data, generated thereby regardless of a request provided from the host 2000, to the non-volatile storage device 200. For example, the memory controller 100 may generate a command, an address, and data for performing a background operation. Also, the memory controller 100 may provide a command, an address, and data to the non-volatile storage device 200.

The background operation, for example, may include a data restore operation and a garbage collection operation. For example, the garbage collection operation may be an operation of copying valid data to a free block among a plurality of memory blocks and erasing invalid data.

In an embodiment, the memory controller 100 may control a plurality of non-volatile storage devices 200 logically operated as one non-volatile storage device 200.

In an embodiment, when write data is provided to the non-volatile storage device 200, the memory controller 100 may update metadata corresponding to the write data. The memory controller 100 may control the volatile memory device 300 to store updated metadata. The metadata may be stored in the non-volatile storage device 200. In booting, the memory controller 100 may load the metadata, stored in the non-volatile storage device 200, into the volatile memory device 300. The metadata temporarily stored in the volatile memory device 300 may be updated by the memory controller 100. The updated metadata may be stored in the non-volatile storage device 200. In an embodiment, metadata may be classified into representative metadata and correlated metadata as illustrated, for example, in FIGS. 6 and 13.

In an embodiment, the memory controller 100 may perform journaling on update information of metadata. The memory controller 100 may control the non-volatile storage device 200 to store a journal log, which is a change point of the metadata.

The memory controller 100 may include a journaling manager 101, an update manager 102, and an operation controller 103. The journaling manager 101, update manager 102, and operation controller 103 may be implemented as functional modules of the memory controller 100 implemented as a processor. Each functional module may comprise a separate processor (e.g., microprocessor or subprocessor), or some or all of the functional modules may be comprised of and share the hardware of the memory controller 100. Connections and interactions between the functional modules and the memory controller 100 may be hardwired and/or in the form of data. The functional modules may each correspond to a separate segment or segments of software (e.g., a subroutine) which configure the memory controller 100, and/or may correspond to segment(s) of software that also correspond to one or more other functional modules (e.g., the functional modules may share certain segment(s) of software or be embodied by the same segment(s) of software).

The journaling manager 101 may generate a journal log in response to storing write data in the non-volatile storage device 200. The journal log may be data representing update information indicating mapping information between a logical address and a physical address.

When all of the journal log is stored in a memory region allocated to the non-volatile storage device 200, the journaling manager 101 may trigger a checkpoint. The checkpoint may be an operation of securing a memory region storing the journal log in the non-volatile storage device 200 and storing updated metadata in the non-volatile storage device 200.

The update manager 102 may obtain metadata temporarily stored in the volatile memory device 300 and may update the metadata on the basis of the journal log.

In booting, the update manager 102 may update metadata on the basis of whether a valid journal log is stored in the non-volatile storage device 200.

The operation controller 103 may generate an address and a first operation command, which issues a command to perform a normal operation, and may provide the address and the first operation command to the non-volatile storage device 200. Here, the normal operation may include a write operation, a read operation, or an erase operation described above, and the first operation command may include a program command, a read command, or a trim command.

The operation controller 103 may generate an address and a second operation command, which issues a command to perform a background operation, and may provide the address and the second operation command to the non-volatile storage device 200. The background operation, for example, may include a garbage operation.

The operation controller 103 may generate an address and a third operation command for controlling the volatile memory device 300 and may provide the address and the third operation command to the non-volatile storage device 200. Here, the third operation command may include a write command or a read command. In an embodiment, the operation controller 103 may provide updated metadata, a write command, and an address to the volatile memory device 300 so as to store the updated metadata. In another embodiment, the operation controller 103 may provide a read command and an address to the volatile memory device 300 so as to obtain metadata.

The operation controller 103 may generate a first journaling command, which issues a command to store a journal log, and a physical address of a memory region where the journal log is to be stored in the non-volatile storage device 200. The operation controller 103 may provide the non-volatile storage device 200 with the journal log, the first journaling command, and a physical address each received from the journaling manager 101.

The operation controller 103 may generate a second journaling command, which issues a command to erase the journal log, and a physical address of a memory region where the journal log is stored in the non-volatile storage device 200. The operation controller 103 may provide the second journaling command and the physical address to the non-volatile storage device 200.

The non-volatile storage device 200 may operate in response to commands from the memory controller 100. In detail, the non-volatile storage device 200 may receive a command and an address from the memory controller 100 and may access a memory cell selected based on an address among a plurality of memory cells (not shown). The non-volatile storage device 200 may perform an operation, instructed by the command, on the memory cell selected based on the address.

The commands from the memory controller 100 may include, for example, a program command, a read command, or a trim command, and the operation instructed by the commands may include, for example, a program operation (or a write operation), a read operation, or an erase operation.

The program operation, executed in response to a command by the memory controller 100, may be an operation of storing, by using the non-volatile storage device 200, data provided from the host 2000. The read operation, executed in response to a command by the memory controller 100, may be an operation of reading, by using the non-volatile storage device 200, read data stored in the non-volatile storage device 200. The erase operation, executed in response to a command by the memory controller 100, may be an operation of erasing, by using the non-volatile storage device 200, data stored in a memory device.

The non-volatile storage device 200 may be, for example, a flash memory-based storage device. Flash memory may include, for example, NAND flash memory and NOR flash memory. The flash memory-based storage device may include, for example, a solid state drive (SSD).

The plurality of non-volatile storage devices 200 may operate based on a redundant array of independent disks (or redundant array of inexpensive disks) (RAID) scheme which logically operates as one memory device.

The volatile memory device 300 may temporarily store data provided from the non-volatile storage device 200 or data provided from the host 2000 only while power is being supplied from a power source. The volatile memory device 300, a buffer memory, may be included in the memory controller 100 or may be disposed outside the memory controller 100. For example, the volatile memory device 300 may include dynamic random access memory (DRAM) or static random access memory (SRAM).

The volatile memory device 300 may flush temporarily stored data to the non-volatile storage device 200 in response to a flush command of the memory controller 100.

The volatile memory device 300 may include a data buffer 310 and a metadata buffer 320.

The data buffer 310 may temporarily store write data provided from the host 2000. Alternatively, the data buffer 310 may temporarily store read data provided from the non-volatile storage device 200.

The metadata buffer 320 may temporarily store metadata. In an embodiment, in booting, the metadata buffer 320 may temporarily store metadata provided from the non-volatile storage device 200.

The host 2000 may communicate with the storage device 1000 through an interface. The interface may be configured to transmit and receive a packet to and from the host 2000. A packet, transmitted from the host 2000 to the interface, may include a command or data to be written to non-volatile storage device 200. A packet, transmitted from the interface to the host 2000, may include a response to the command or data read from the non-volatile storage device 200. The interface may transmit data to be written to the non-volatile storage device 200 to the non-volatile storage device 200, or may receive read data from the non-volatile storage device 200. The interface may be configured to comply with standards such as JEDEC Toggle standards or ONFI standards.

In an embodiment, the host 2000 may provide the storage device 1000 with a write request which issues a request to store data in the storage device 1000. Also, the host 2000 may provide the storage device 1000 with the write request, data, and a logical address for identifying the data. In response to the write request provided from the host 2000, the storage device 1000 may store write data including metadata and data, provided from the host 2000, in the non-volatile storage device 200 and may provide the host 2000 with a response representing the completion of storage.

Figure 2:
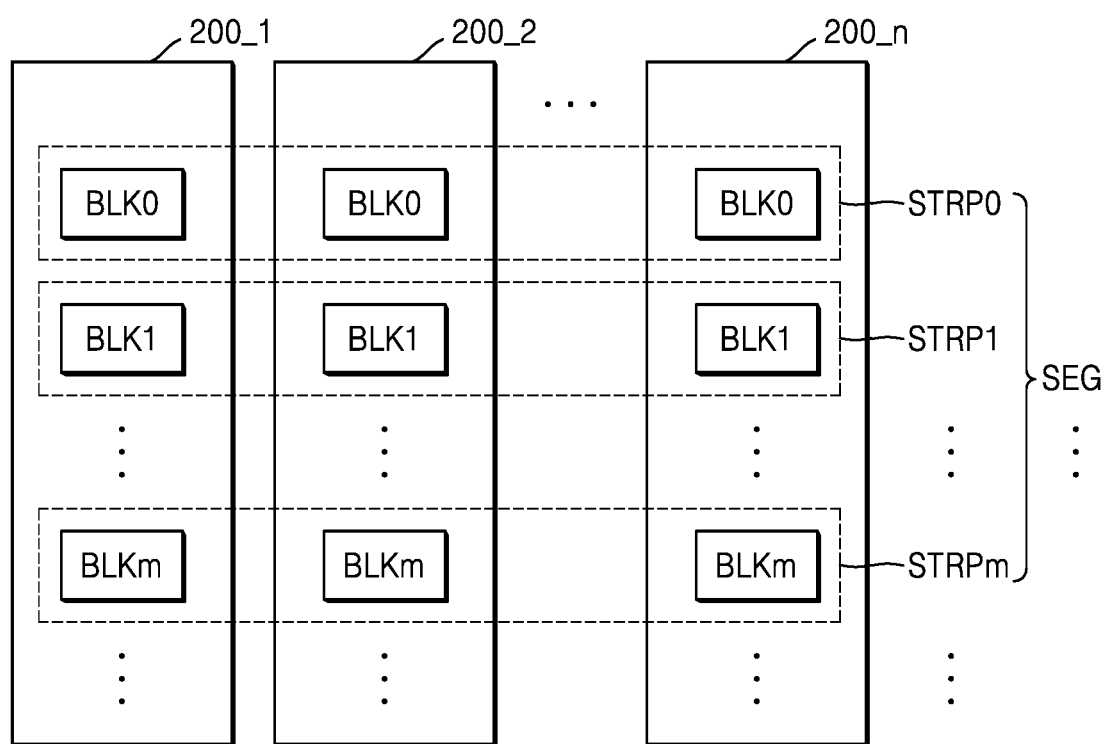
FIG. 2 is a diagram for describing a stripe and a segment.

FIG. 2 is a diagram for describing a stripe and a segment.

Referring to FIGS. 1 and 2, each of a plurality of non-volatile storage devices 200_1 to 200_n may communicate with the memory controller 100 through an individual interface.

Each of the plurality of non-volatile storage devices 200_1 to 200_n may include a plurality of memory blocks BLK0 to BLKm. A memory block may include a user block or a system block. The user block may include a memory block which stores data provided from a host or data which is to be provided to the host. The system block may include a memory block which stores metadata or a journal log.

The plurality of non-volatile storage devices 200_1 to 200_n may logically operate as one memory device. The plurality of non-volatile storage devices 200_1 to 200_n logically operating as one memory device may be classified into a non-volatile storage device, operating as a memory region storing data provided from the host, and a non-volatile storage device operating as memory regions storing metadata and a journal log. For example, a first memory region may correspond to the plurality of memory blocks BLK0 to BLKm included in Nos. 1 to n−1 non-volatile storage devices 200_1 to 200_n−1. For example, No. n non-volatile storage devices 200_n may operate as memory regions storing the metadata and the journal log. In this case, some of the plurality of memory blocks BLK0 to BLKm included in the No. n non-volatile storage devices 200_n may correspond to a second memory region storing the journal log, and the other memory blocks may correspond to a third memory region storing the metadata.

A stripe STRP may be a set of memory blocks selected from among the plurality of non-volatile storage devices 200_1 to 200_n. That is, one stripe may be a logical group where at least one memory block included in each non-volatile storage device operates as one memory block. For example, No. 0 stripe STRP0 may be configured with No. 0 memory block BLK0 included in the No. 1 non-volatile storage device 200_1, No. 0 memory block BLK0 included in the No. 2 non-volatile storage device 200_2, ... and No. 0 memory block BLK0 included in the No. n non-volatile storage device 200_n. For example, No. 1 stripe STRP1 may be configured with No. 1 memory block BLK1 included in the No. 1 non-volatile storage device 200_1, No. 1 memory block BLK1 included in the No. 2 non-volatile storage device 200_2 ... and No. 1 memory block BLK1 included in the No. n non-volatile storage device 200_n. Likewise, No. m stripe STRPm may be configured with No. m memory blocks BLKm respectively included in the plurality of non-volatile storage devices 200_1 to 200_n. Memory blocks included in one stripe may be physically different memory blocks, but may logically operate like one memory block. That is, data may be simultaneously written in memory blocks included in one stripe.

One segment SEG may be a set of continuous stripes. The number of stripes included in one segment SEG may be previously set before the storage device 1000 is released. For example, one segment SEG may be logically configured with No. 0 to m stripes STRP0 to STRPm.

Figure 3:
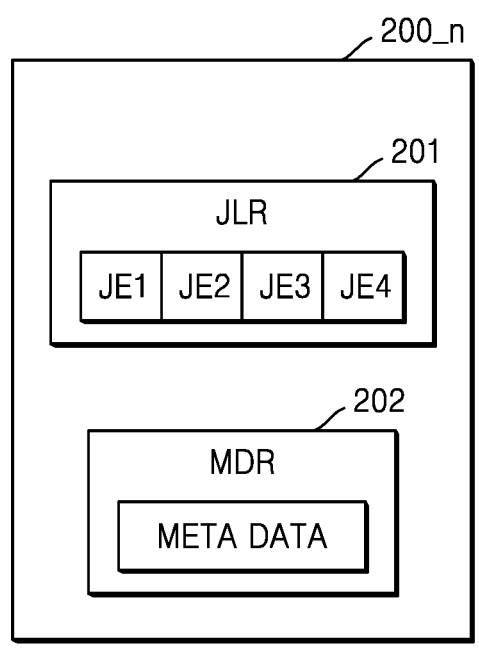
FIG. 3 is a diagram for describing a journal log region and a metadata region.

FIG. 3 is a diagram for describing a journal log region and a metadata region.

In describing an embodiment illustrated in FIG. 3, it may be assumed that No. n non-volatile storage device 200_n operates as memory regions storing metadata and a journal log.

Referring to FIGS. 2 and 3, a second memory region 201 of the No. n non-volatile storage device 200_n may be a memory region where the journal log is stored. The second memory region 201 may correspond to some of a plurality of memory blocks BLK0 to BLKm included in the No. n non-volatile storage device 200_n. The second memory region 201 may be configured with a plurality of journal entries JE1 to JE4.

A third memory region 202 of the No. n non-volatile storage device 200_n may be a memory region where metadata (META DATA) is stored. The third memory region 202 may correspond to the other memory blocks, except the second memory region 201, of the plurality of memory blocks BLK0 to BLKm included in the No. n non-volatile storage device 200_n.

Figure 4:
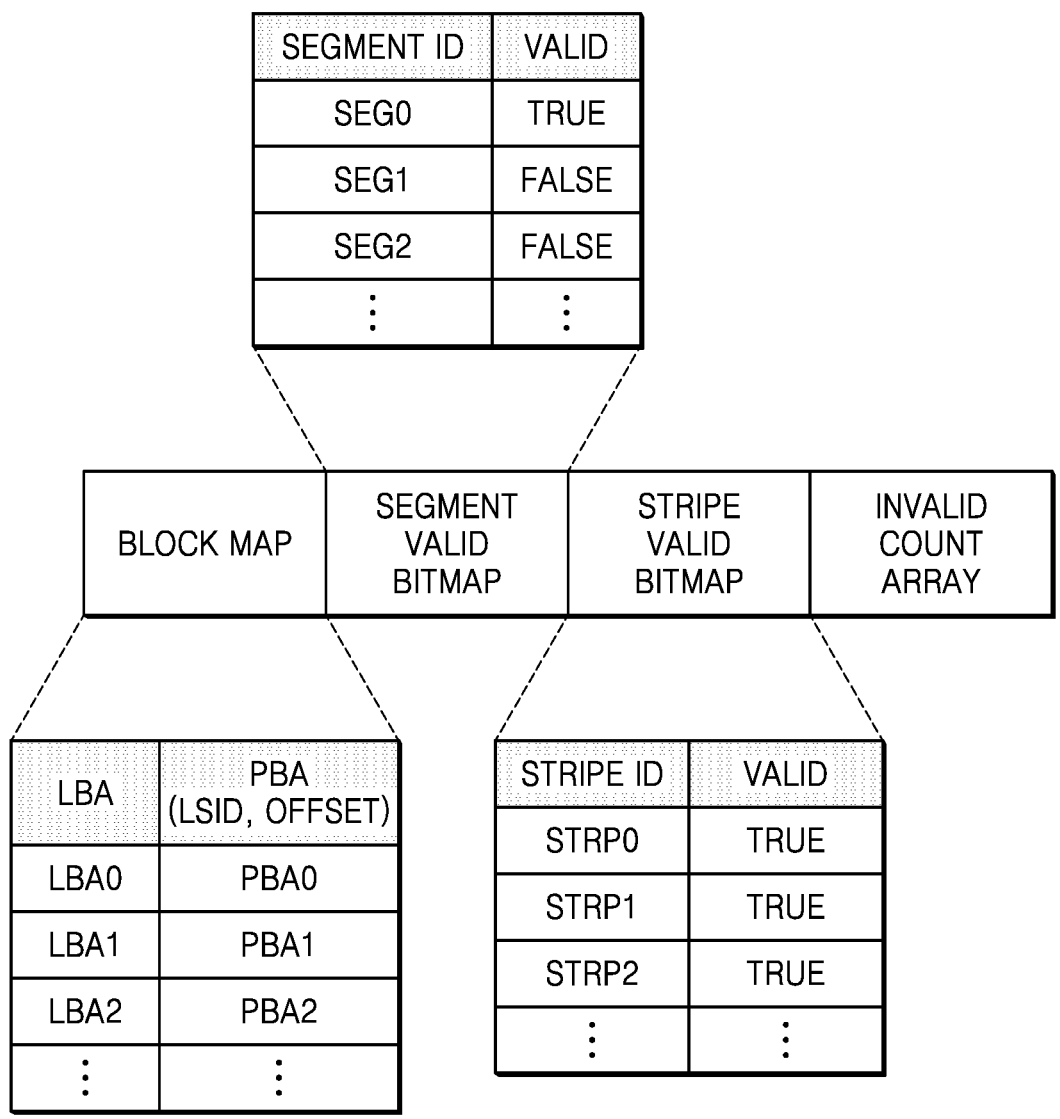
FIG. 4 is a diagram for describing metadata according to an embodiment.

FIG. 4 is a diagram for describing metadata according to an embodiment.

Referring to FIG. 4, metadata (META DATA) may include map data (BLOCK MAP), first allocation data (SEGMENT VALID BITMAP), second allocation data (STRIPE VALID BITMAP), and invalid count data (INVALID COUNT ARRAY).

The map data (BLOCK MAP) may be data representing mapping information between a logical address (LBA) and a physical address (PBA). The map data (BLOCK MAP) may be implemented as a logical-physical table. The physical address (PBA) may be an address of a memory block selected from among the plurality of memory blocks BLK0 to BLKm included in the non-volatile storage device 200. The physical address (PBA) may include stripe information (LSID) and offset information (OFFSET). The stripe information (LSID) may be information indicating a number of a stripe. For example, when a value based on the stripe information (LSID) is 0, this may indicate No. 0 stripe (STRP0). The offset information (OFFSET) may be information indicating a number of a memory block, where write data is lastly stored, of memory blocks included in a stripe. For example, when a value based on the stripe information (LSID) is 0 and a value based on the offset information (OFFSET) is 0, the physical address (PBA) may represent No. 0 memory block BLK0 included in No. 1 non-volatile storage device 200_1.

The first allocation data (SEGMENT VALID BITMAP) may be data representing the allocation or not of a plurality of segments. In an embodiment, the first allocation data (SEGMENT VALID BITMAP) may be implemented as a bitmap expressed as true (TRUE) or false (FALSE) for each segment (SEGMENT ID). In this case, the true (TRUE) may indicate that a corresponding segment is allocated. For example, No. 0 segment (SEG0) expressed as true (TRUE) may be allocated, and No. 1 segment (SEG1) and No. 2 segment (SEG2) expressed as false (FALSE) may not be allocated. However, the inventive concept is not limited thereto.

The second allocation data (STRIPE VALID BITMAP) may be data representing the allocation or not of a plurality of stripes included in an allocated segment. In an embodiment, the second allocation data (STRIPE VALID BITMAP) may be implemented as a bitmap expressed as true (TRUE) or false (FALSE) for each stripe. In this case, the true (TRUE) may indicate that a corresponding segment is allocated, but is not limited thereto.

The invalid count data (INVALID COUNT ARRAY) may be data representing an invalid count. The invalid count may be the number of times data stored in the non-volatile storage device 200 is processed as invalid.

As the map data (BLOCK MAP) is changed, the first allocation data (SEGMENT VALID BITMAP), the second allocation data (STRIPE VALID BITMAP), and the invalid count data (INVALID COUNT ARRAY) may be changed. In this case, the map data (BLOCK MAP) may be closely associated with the first allocation data (SEGMENT VALID BITMAP), the second allocation data (STRIPE VALID BITMAP), and the invalid count data (INVALID COUNT ARRAY). That is, the map data (BLOCK MAP) may be representative metadata. Also, correlated metadata may include the first allocation data (SEGMENT VALID BITMAP), the second allocation data (STRIPE VALID BITMAP), and the invalid count data (INVALID COUNT ARRAY).

Figure 5:
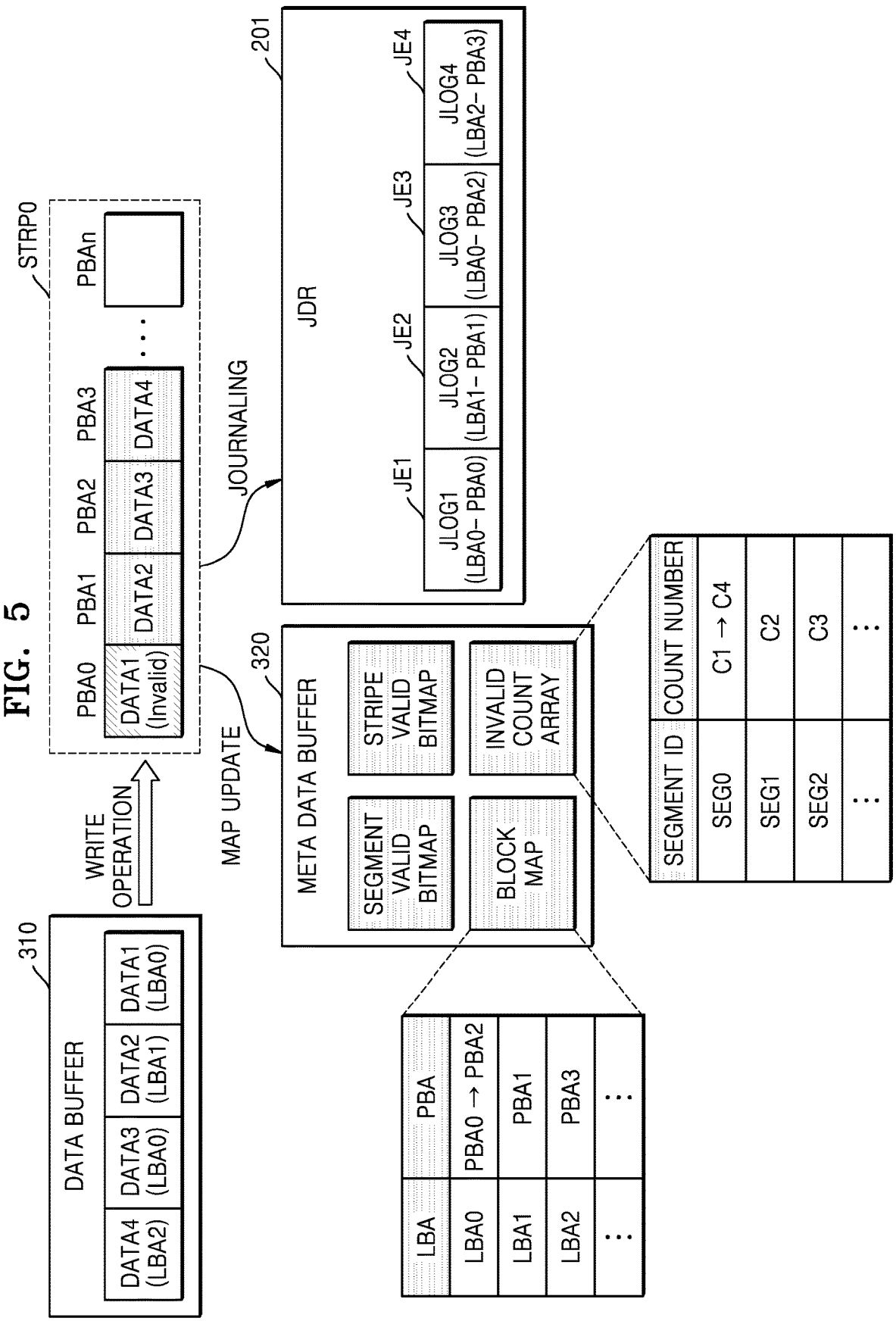
FIG. 5 is a diagram for describing a write operation, a journaling operation, and a map update operation, according to an embodiment.

FIG. 5 is a diagram for describing a write operation, a journaling operation, and a map update operation, according to an embodiment.

In describing an embodiment illustrated in FIG. 5, it may be assumed that memory blocks having Nos. 0 to n physical addresses (PBA0) to (PBAn) are included in No. 0 stripe (STRP0) of a first memory region described above.

Referring to FIGS. 1 and 5, the memory controller 100 may temporarily store write data (DATA1), corresponding to No. 0 logical address (LBA0), in a data buffer 310. The memory controller 100 may convert the No. 0 logical address (LBA0) into No. 0 physical address (PBA0). As data is not stored in a memory block having the No. 0 physical address (PBA0), the memory controller 100 may express, as true (TRUE), allocation information (VALID) about No. 0 stripe (STRP0) and may generate offset information (OFFSET) indicating a value of 0, and thus, may allocate a memory block. At this time, when a number of a stripe is a first stripe (for example, the No. 0 stripe (STRP0) included in No. 0 segment (SEG0)) in each segment, the memory controller 100 may express, as true (TRUE), allocation information (VALID) about a corresponding segment. The memory controller 100 may provide write data (DATA1), the No. 0 physical address (PBA0), and a write command to the non-volatile storage device 200. The write data (DATA1) may be stored in a memory block having the No. 0 physical address (PBA0). The memory controller 100 may provide modified metadata, an address, and a write command to the volatile memory device 300 to update metadata temporarily stored in the metadata buffer 320. In this case, the modified metadata may include map data (BLOCK MAP) in which mapping information of the No. 0 logical address (LBA0) and the No. 0 physical address (PBA0), first allocation data (SEGMENT VALID BITMAP) in which allocation information (VALID) about modified No. 0 segment (SEG0) is reflected, and second allocation data (STRIPE VALID BITMAP) in which allocation information (VALID) about modified No. 0 stripe (STRP0) is reflected. The memory controller 100 may generate a journal log (JLOG1) in response to storing the write data (DATA1) in a first memory region. The memory controller 100 may provide the non-volatile storage device 200 with the journal log (JLOG1), a physical address of a second memory region 201 where the journal log (JLOG1) is to be stored, and a first journaling command. The journal log (JLOG1) may be stored in a first journal entry (JE1) of the second memory region 201 and may represent the mapping information of the No. 0 logical address (LBA0) and the No. 0 physical address (PBA0).

Write data (DATA2) corresponding to No. 1 logical address (LBA1) may be temporarily stored in the data buffer 310. The No. 1 logical address (LBA1) may be converted into No. 1 physical address (PBA1). The memory controller 100 may change a value of the offset information (OFFSET) from 0 to 1, and thus, may allocate a memory block having the No. 1 physical address (PBA1). The write data (DATA2) may be stored in the memory block having the No. 1 physical address (PBA1). The memory controller 100 may update metadata. In this case, mapping information of the No. 1 logical address (LBA1) and the No. 1 physical address (PBA1) may be reflected in the map data (BLOCK MAP). A journal log (JLOG2) generated by the memory controller 100 may be stored in a second journal entry (JE2) and may represent the mapping information of the No. 1 logical address (LBA1) and the No. 1 physical address (PBA1).

Write data (DATA3) corresponding to the No. 0 logical address (LBA0) may be temporarily stored in the data buffer 310, and the No. 0 logical address (LBA0) may be converted into a physical address. In the non-volatile storage device 200, overwriting may be impossible, and thus, the physical address obtained by converting the No. 0 logical address (LBA0) may be the No. 2 physical address (PBA2). A memory block having the No. 2 physical address (PBA2) may be allocated. The non-volatile storage device 200 may process, as invalid, the write data (DATA1) stored in a memory block having the No. 0 logical address (LBA0) and may store the write data (DATA1) in the memory block having the No. 2 physical address (PBA2). The memory controller 100 may change an invalid count of No. 0 segment (SEG0), including No. 0 stripe (STRP0), from C1 to C4. Here, C4 may be a natural number which is greater than C1. Mapping information of the No. 0 logical address (LBA0) and the No. 2 physical address (PBA2) may be reflected in map data (BLOCK MAP), and information indicating where the invalid count of the No. 0 segment (SEG0) is changed to C4 may be reflected in invalid count data (INVALID COUNT ARRAY). A journal log (JLOG3) stored in a third journal entry (JE3) may represent mapping information of the No. 0 logical address (LBA0) and the No. 2 physical address (PBA2).

Write data (DATA4) corresponding to the No. 2 logical address (LBA2) may be temporarily stored in the data buffer 310, the No. 2 logical address (LBA2) may be converted into No. 3 physical address (PBA3), and a memory block having the No. 3 physical address (PBA3) may be allocated. Write data (DATA4) may be stored in the memory block having the No. 3 physical address (PBA3). Mapping information of the No. 2 logical address (LBA2) and the No. 3 physical address (PBA3) may be reflected in the map data (BLOCK MAP). A journal log (JLOG4) may represent the mapping information of the No. 2 logical address (LBA2) and the No. 3 physical address (PBA3).

The memory controller 100 may control the non-volatile storage device 200 to store each write data and a parity bit (not shown) corresponding to each write data.

As described above, journaling may be performed on update information indicating map data corresponding to representative metadata, and thus, a reduction in performance caused by the journaling may be minimized and power unnecessarily consumed by a storage device may decrease.

When the journal logs (JLOG1 to JLOG4) are fully filled into a plurality of journal entries (JE1 to JE4), it may be required that the plurality of journal entries (JE1 to JE4) are emptied and metadata temporarily stored in the metadata buffer 320 is permanently stored in the non-volatile storage device 200. An operation of emptying a journal entry and permanently storing metadata may be defined as a checkpoint.

Figure 6:
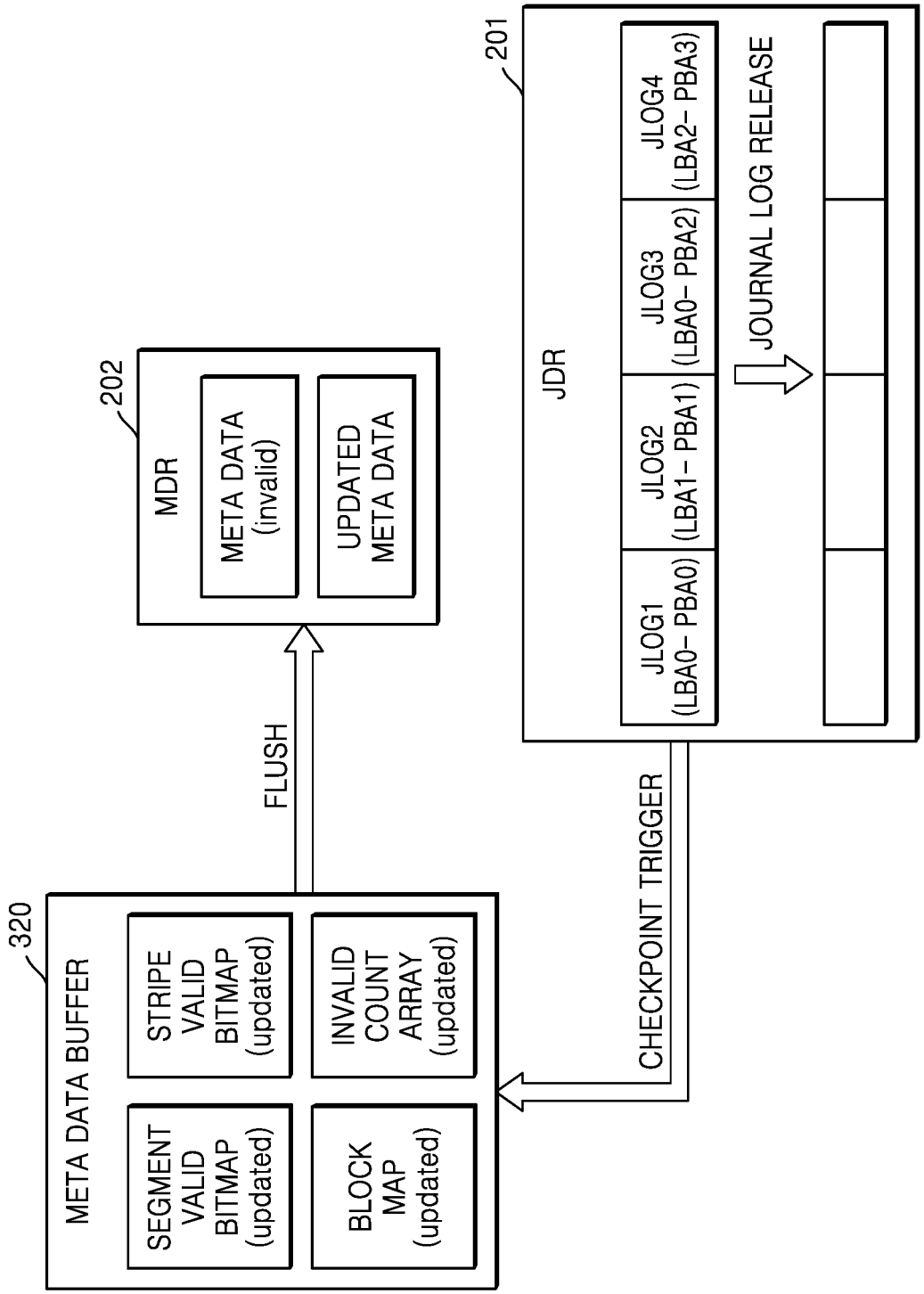
FIG. 6 is a diagram for describing a checkpoint according to an embodiment.

FIG. 6 is a diagram for describing a checkpoint according to an embodiment.

Referring to FIG. 6, a storage space of a second memory region 201 may correspond to a plurality of journal entries (JE1 to JE4). When a plurality of journal logs (JLOG1 to JLOG4) are fully filled into the plurality of journal entries (JE1 to JE4), a checkpoint may be triggered (CHECKPOINT TRIGGER).

In an embodiment, when a journal log corresponding to a size of the second memory region 201 is stored in the second memory region 201, the memory controller 100 may provide a flush command to the volatile memory device 300. The flush command may be a command which issues a command to flush updated metadata to the non-volatile storage device 200. Updated map data (BLOCK MAP), updated first allocation data (SEGMENT VALID BITMAP), updated second allocation data (STRIPE VALID BITMAP), and updated invalid count data (INVALID COUNT ARRAY) may be provided to the non-volatile storage device 200. The non-volatile storage device 200 may process, as invalid, metadata (META DATA) stored in a third memory region 202 and may store updated metadata (UPDATED META DATA) in the third memory region 202.

In an embodiment, when the updated metadata (UPDATED META DATA) is stored in the third memory region 202, the memory controller 100 may provide the non-volatile storage device 200 with a second journaling command which issues a command to release a journal log. The non-volatile storage device 200 may release the journal logs (JLOG1 to JLOG4) stored in the plurality of journal entries (JE1 to JE4) in response to the second journaling command.

Figure 7:
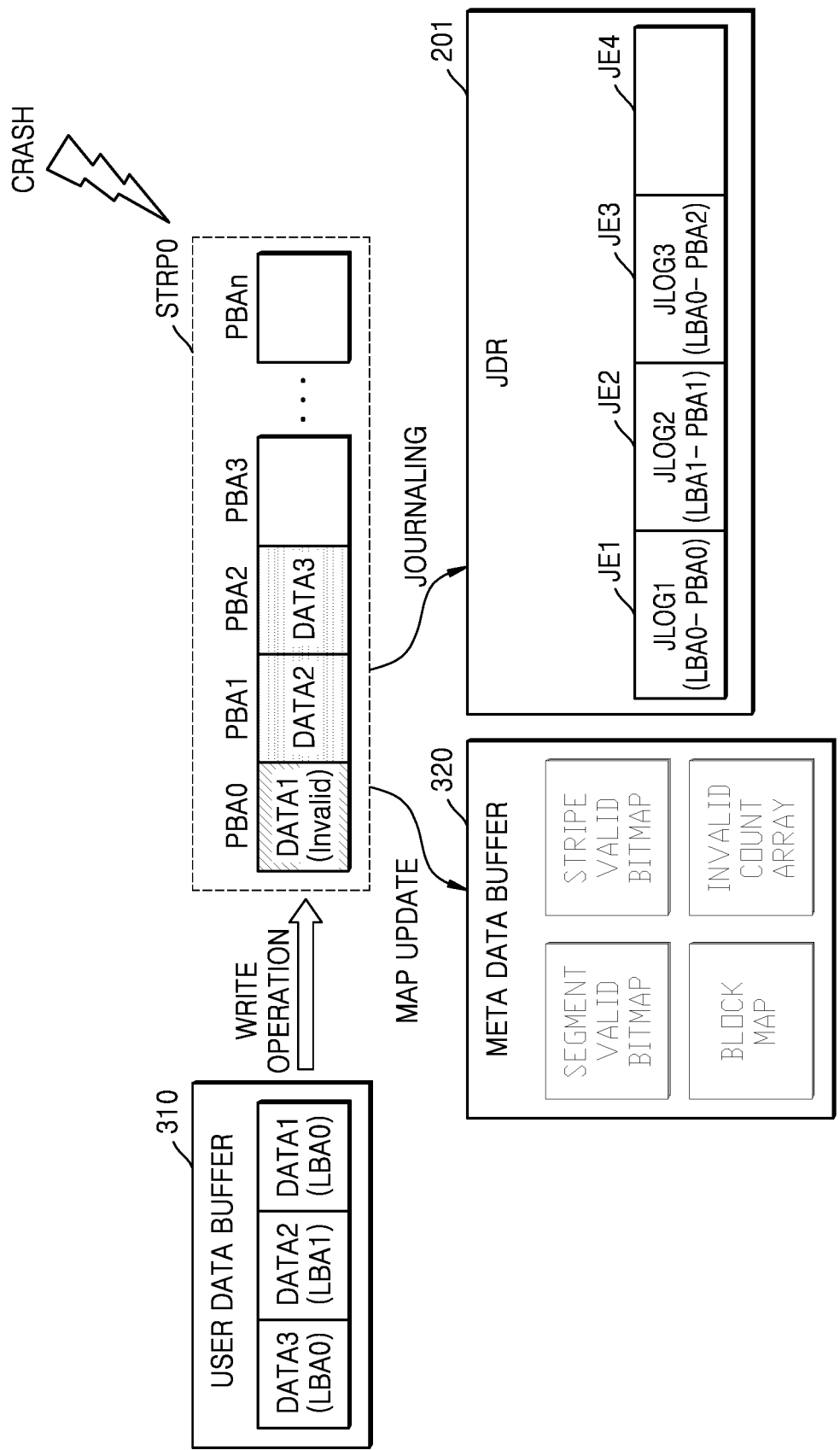
FIG. 7 is a diagram for describing a state of a storage device based on the occurrence of a crash.

FIG. 7 is a diagram for describing a state of a storage device based on the occurrence of a crash.

Referring to FIG. 7, pieces of write data (DATA1 to DATA3) may be stored in a first memory region, and thus, metadata (META DATA) may be updated. A plurality of journal logs (JLOG1 to JLOG3) may be sequentially stored in first to third journal entries (JE1 to JE3).

A crash (CRASH) may occur in performing an operation such as a write operation (WRITE OPERATION). The crash (CRASH) may denote, for example, an event such as sudden power off, where power supplied from the outside to the storage device 1000 is unexpectedly cut off, or kernel panic occurring when it is impossible to stably repair an internal fatal error sensed by an operating system. When the crash (CRASH) occurs, metadata temporarily stored in the metadata buffer 320 may be erased or damaged, but pieces of data (DATA1, DATA2, and DATA3) stored in the non-volatile storage device 200 may maintain a stored state.

When the crash (CRASH) occurs in a state where a checkpoint is not performed yet, updated metadata may not be stored in the non-volatile storage device 200, and the performance of the non-volatile storage device 200 may be reduced.

In order to address such a problem, it may be required to perform a restore operation of restoring the updated metadata after the crash (CRASH) occurs.

Figure 8:
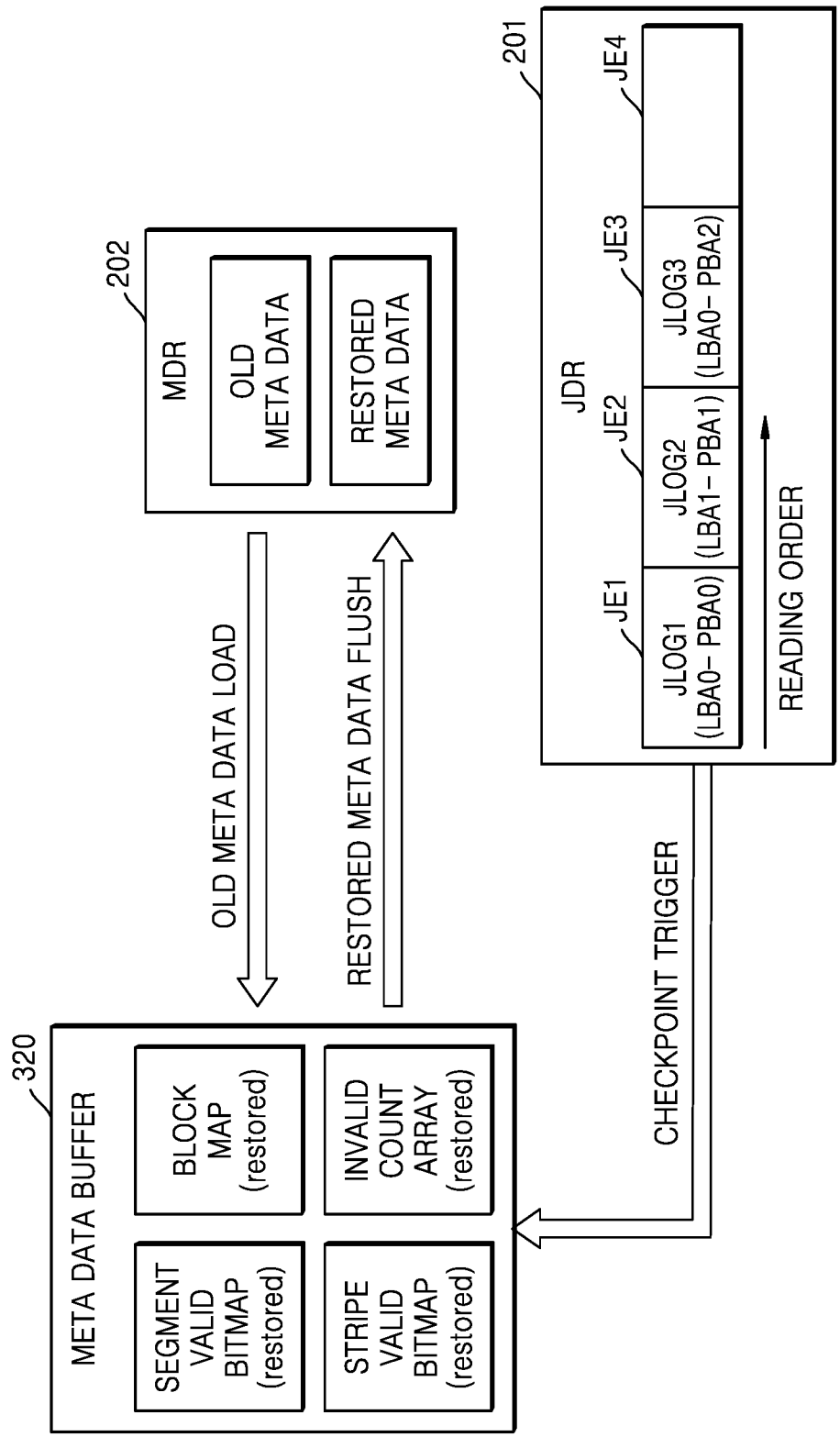
FIG. 8 is a diagram for describing a restore operation according to an embodiment.

FIG. 8 is a diagram for describing a restore operation according to an embodiment.

Referring to FIG. 8, when power, from outside of the storage device 1000, is supplied to the storage device 1000 after a crash (CRASH) occurs, the memory controller 100 may control the non-volatile storage device 200 to read a plurality of journal logs (JLOG1, JLOG2, and JLOG3) stored in the second memory region 201 and old metadata (OLD META DATA) stored in the third memory region 202. The old metadata (OLD META DATA) may be metadata which is stored in the non-volatile storage device 200 before power is supplied to the storage device 1000. In an embodiment, the journal logs (JLOG1, JLOG2, and JLOG3) stored in the second memory region 201 may be read sequentially in ascending order of entry numbers of a plurality of journal entries (JE1 to JE4).

The journal logs (JLOG1, JLOG2, and JLOG3) may be sequentially loaded into the metadata buffer 320, and moreover, the old metadata (OLD META DATA) may be loaded into the metadata buffer 320. The memory controller 100 may update the old metadata (OLD META DATA) on the basis of the journal logs (JLOG1, JLOG2, and JLOG3) to restore metadata. Restored metadata (RESTORED META DATA) may include, for example, restored map data (BLOCK MAP), restored first allocation data (SEGMENT VALID BITMAP), restored second allocation data (STRIPE VALID BITMAP), and restored invalid count data (INVALID COUNT ARRAY).

The memory controller 100 may control the volatile memory device 300 to flush the restored metadata (RESTORED META DATA) to the non-volatile storage device 200. The restored metadata (RESTORED META DATA) may be stored in the third memory region 202, and the old metadata (OLD META DATA) may be processed as invalid.

Hereinafter, an operation of restoring metadata on the basis of a journal log will be described in detail.

Figure 9:
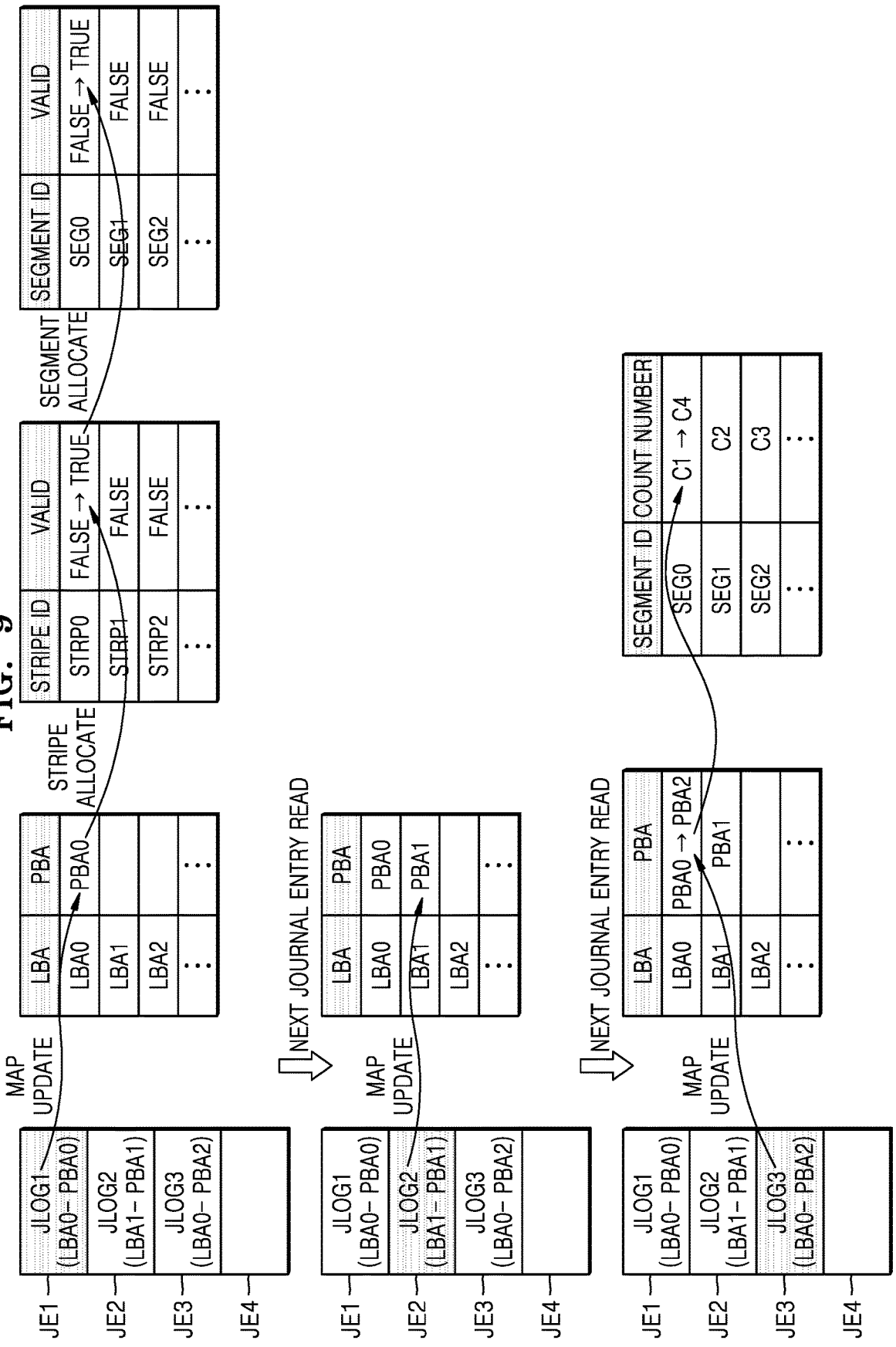
FIG. 9 is a diagram for describing map update, allocation data, and invalid count data on the basis of a journal log.

FIG. 9 is a diagram for describing map update, allocation data, and invalid count data on the basis of a journal log.

Referring to FIG. 9, a journal log (JLOG1) stored in a first journal entry (JE1) may represent first mapping information of No. 0 logical address (LBA0) and No. 0 physical address (PBA0). The memory controller 100 may generate map data (BLOCK MAP) in which the first mapping information of the No. 0 logical address (LBA0) and the No. 0 physical address (PBA0) is reflected, on the basis of the journal log (JLOG1). A memory block having the No. 0 physical address (PBA0) may be a first memory block of No. 0 stripe (STRP0). In this case, as the No. 0 stripe (STRP0) needs to be allocated, the memory controller 100 may express allocation information (VALID) about the No. 0 stripe (STRP0) as true (TRUE) to generate second allocation data (STRIPE VALID BITMAP). The memory controller 100 may generate offset information (OFFSET) where a value is 0. The No. 0 stripe (STRP0) may be a first stripe of No. 0 segment (SEG0). In this case, as the No. 0 segment (SEG0) needs to be allocated, the memory controller 100 may express allocation information (VALID) about the No. 0 segment (SEG0) as true (TRUE) to generate first allocation data (SEGMENT VALID BITMAP).

A journal log (JLOG2) stored in a second journal entry (JE2) may represent first mapping information of No. 1 logical address (LBA1) and No. 1 physical address (PBA1). In this case, map data (BLOCK MAP) in which the first mapping information of the No. 1 logical address (LBA1) and the No. 1 physical address (PBA1) is reflected may be generated. The offset information (OFFSET) may be changed from 0 to 1. A memory block having the No. 1 physical address (PBA1) may be a second memory block of No. 0 stripe (STRP0). In this case, as the No. 0 stripe (STRP0) and the No. 0 segment (SEG0) have been allocated, first allocation data (SEGMENT VALID BITMAP) and the second allocation data (STRIPE VALID BITMAP) may be maintained.

A journal log (JLOG3) stored in a third journal entry (JE3) may represent second mapping information of No. 0 logical address (LBA0) and No. 2 physical address (PBA2). Map data (BLOCK MAP) including the second mapping information changed from the first mapping information may be generated. In the map data (BLOCK MAP), the No. 0 physical address (PBA0) mapped to the No. 0 logical address (LBA0) may be changed to the No. 2 physical address (PBA2). In this case, the memory controller 100 may change an invalid count of the No. 0 segment (SEG0) from C1 to C4.

As described above, even when an unexpected event occurs, consistency between metadata and a journal log may be ensured, and the reliability of a storage device may be improved.

Also, as described above, in addition to map data, metadata associated with data may be restored based on only a journal log corresponding to the map data after a crash occurs, and thus, unnecessarily consumed power may be reduced.

Figure 10:
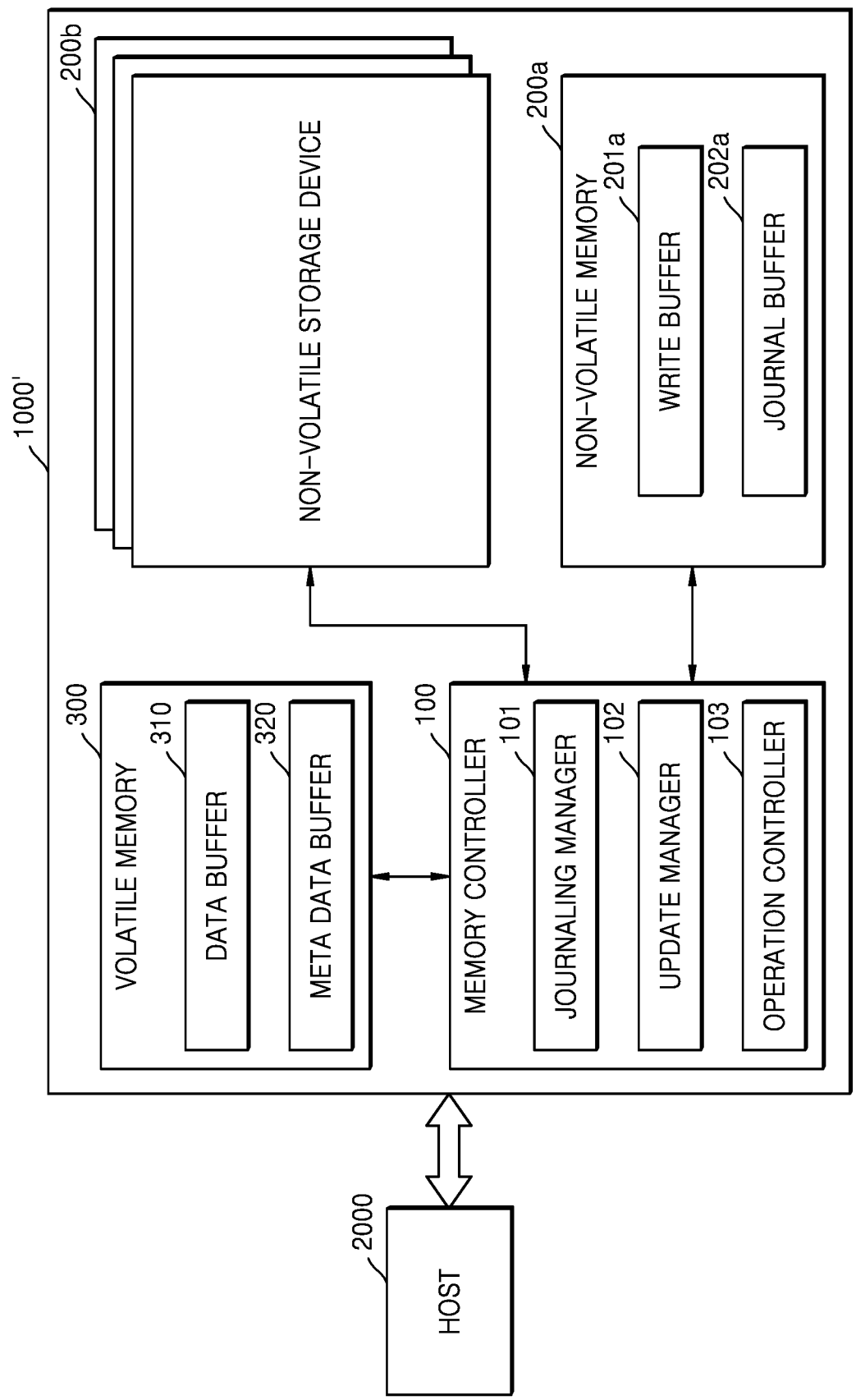
FIG. 10 is a diagram for describing a storage system according to another embodiment.

FIG. 10 is a diagram for describing a storage system according to another embodiment.

Referring to FIG. 10, the storage system according to another embodiment may include a storage device 1000' and a host 2000.

The storage device 1000' may include a memory controller 100, a non-volatile memory device 200a, a non-volatile storage device 200b, and a volatile memory device 300.

The memory controller 100 and the volatile memory device 300 may perform operations described above with reference to FIG. 1.

The non-volatile memory device 200a may include a write buffer 201a and a journal buffer 202a. For example, the non-volatile memory device 200a may be implemented with non-volatile random access memory (NVRAM).

Like the first memory region of the non-volatile storage device 200, the write buffer 201a may store write data. However, the write buffer 201a may be a physical memory region, and the first memory region of the non-volatile storage device 200 may be a logically implemented region. The write buffer 201a may include a plurality of stripes.

In another embodiment, the operation controller 103 may control the non-volatile memory device 200a to store the write data, provided from the host 2000, in the write buffer 201a.

The journal buffer 202a, like the second memory region 201 of the non-volatile storage device 200 illustrated in FIG. 1, may store a journal log. However, the journal buffer 202a may be a physical memory region, and the second memory region 201 of the non-volatile storage device 200 may be a logically implemented region. The journal buffer 202a may be configured with a plurality of j ournal entries.

In another embodiment, the operation controller 103 may control the non-volatile memory device 200a to store the journal log, provided from a journaling manager 101, in the journal buffer 202a.

The non-volatile storage device 200b may store the write data and metadata.

In another embodiment, the non-volatile storage device 200b may logically operate as one storage device and may include a first memory block group storing the write data and a second memory block group storing the metadata. The non-volatile storage device 200b may include a plurality of segments, and each of the plurality of segments may include a plurality of stripes.

In another embodiment, the operation controller 103 may control the non-volatile memory device 200a and the non-volatile storage device 200b to flush the write data, stored in the write buffer 201a, to the non-volatile storage device 200b.

In another embodiment, in response to storing all journal logs in the journal buffer 202a, the operation controller 103 may control the volatile memory device 300 to flush the metadata, temporarily stored in the metadata buffer 320, to the non-volatile storage device 200b.

Figure 11:
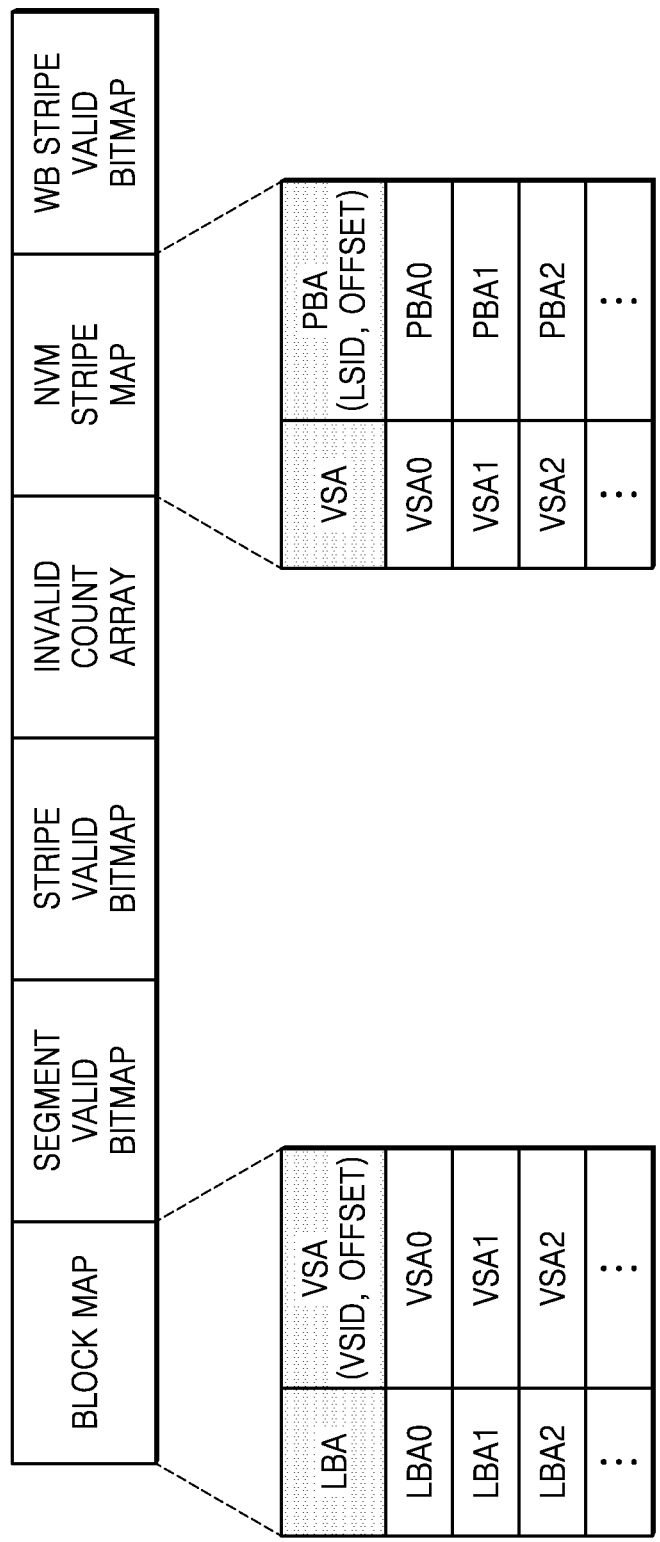
FIG. 11 is a diagram for describing metadata according to another embodiment.

FIG. 11 is a diagram for describing metadata according to another embodiment.

Referring to FIG. 11, the metadata according to another embodiment may include first map data (BLOCK MAP), second map data (NVM STRIPE MAP), first allocation data (SEGMENT VALID BITMAP), second allocation data (STRIPE VALID BITMAP), third allocation data (WB STRIPE VALID BITMAP), and invalid count data (INVALID COUNT ARRAY).

The first map data (BLOCK MAP) may be data representing mapping data about a logical address (LBA) and a first address (VSA). The first address (VSA) may be an address of the write buffer 201a. In an embodiment, the first address (VSA) may be a virtual address and may include first stripe information (VSID) and offset information (OFFSET). The first stripe information (VSID) may be information indicating a number of a stripe selected from among the plurality of stripes included in the write buffer 201a. The offset information (OFFSET) may be information indicating a number of a memory block where write data is lastly stored.

The second map data (NVM STRIPE MAP) may be data representing mapping data about the first address (VSA) and a second address (PBA). The second address (PBA) may be a physical address of a memory selected from among the plurality of memory blocks included in the non-volatile storage device 200b. The second address (PBA) may include second stripe information (LSID) and offset information (OFFSET). The second stripe information (LSID) may be as described below with reference to FIGS. 2 and 4. The offset information (OFFSET) about the first address (VSA) may have the same value as that of the offset information (OFFSET) about the second address (PBA).

The first allocation data (SEGMENT VALID BITMAP) may be data representing the allocation or not of the plurality of segments included in the non-volatile storage device 200b. The first allocation data (SEGMENT VALID BITMAP) may be as described above with reference to FIGS. 2 and 4.

The second allocation data (STRIPE VALID BITMAP) may be data representing the allocation or not of the plurality of stripes included in the non-volatile storage device 200b.

In an embodiment, when the non-volatile storage device 200b includes a first memory block group, the first allocation data (SEGMENT VALID BITMAP) and the second allocation data (STRIPE VALID BITMAP) may represent information indicating an allocated storage space in the first memory block group.

The third allocation data (WB STRIPE VALID BITMAP) may be data representing information indicating an allocated storage space in the write buffer 201a. In an embodiment, the third allocation data (WB STRIPE VALID BITMAP) may be data representing the allocation or not of the plurality of stripes included in the write buffer 201a.

The invalid count data (INVALID COUNT ARRAY) may be data representing the number of times data stored in the non-volatile storage device 200b is processed as invalid. In an embodiment, the invalid count data (INVALID COUNT ARRAY) may be data representing the number of times a memory block is processed as invalid in the first memory block group included in the non-volatile storage device 200b.

Figure 12:
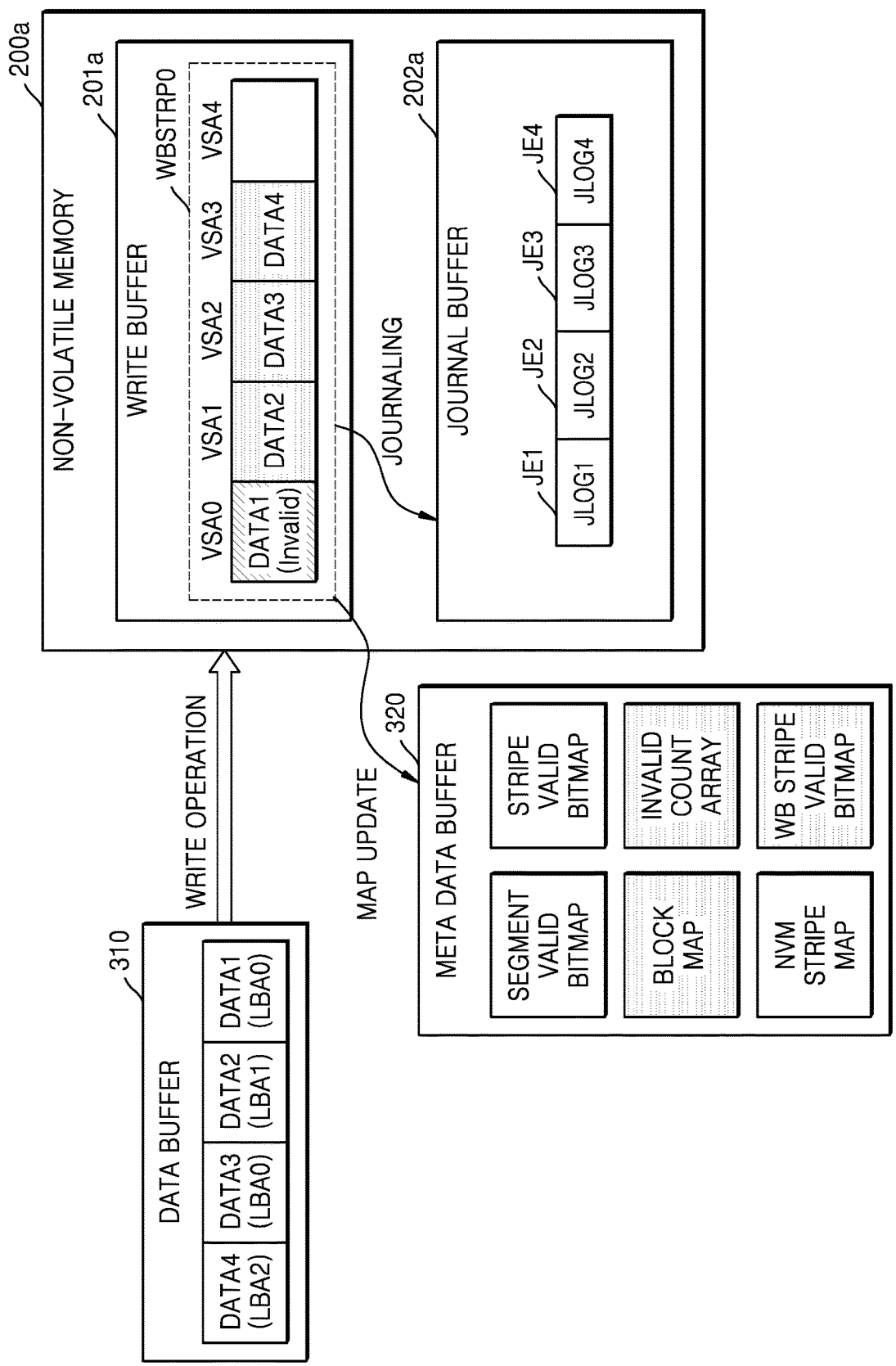
FIG. 12 is a diagram for describing a write operation, a journaling operation, and a map update operation, according to another embodiment.

FIG. 12 is a diagram for describing a write operation, a journaling operation, and a map update operation, according to another embodiment.

In describing an embodiment illustrated in FIG. 12, it may be assumed that a write buffer 201a includes a plurality of memory blocks having Nos. 0 to 4 addresses (VSA0) to (VSA4) and a journal buffer 202a includes first to fourth journal entries (JE1 to JE4). Also, it may be assumed that a plurality of memory blocks having Nos. 0 to n addresses (VSA0) to (VSAn) are included in No. 0 stripe (WBSTRP0).

Referring to FIG. 12, write data (DATA1) corresponding to No. 0 logical address (LBA0) may be temporarily stored in a data buffer 310. A memory controller 100 may convert No. 0 logical address (LBA0) into No. 0 address (VSA0). The No. 0 address (VSA0) may be a first memory block included in the No. 0 stripe (WBSTRP0) of the write buffer 201a. The memory controller 100 may express, as true (TRUE), allocation information (VALID) about the No. 0 stripe (WBSTRP0) and may generate offset information (OFFSET) indicating a value of 0, and thus, may allocate a memory block having the No. 0 address (VSA0). Write data (DATA1) may be stored in the memory block having the No. 0 address (VSA0). Mapping information of the No. 0 logical address (LBA0) and the No. 0 address (VSA0) may be reflected in map data (BLOCK MAP), and allocation information (VALID) about the converted No. 0 stripe (WBSTRP0) may be reflected in third allocation data (WB STRIPE VALID BITMAP). In response to storing the write data (DATA1) in the write buffer 201a, the memory controller 100 may provide the non-volatile memory device 200a with a physical address and a journal log (JLOG1), each corresponding to the journal buffer 202a, and a journaling command. The journal log (JLOG1) may be stored in a first journal entry (JE1) of the journal buffer 202a and may represent mapping information of No. 0 logical address (LBA0) and No. 0 address (VSA0).

No. 1 logical address (LBA1) may be mapped to No. 1 address (VSA1). Write data (DATA2) corresponding to the No. 1 logical address (LBA1) may be stored in a memory block having the No. 1 address (VSA1). A value of the offset information (OFFSET) may be changed from 0 to 1. Mapping information of the No. 1 logical address (LBA1) and the No. 1 address (VSA1) may be reflected in map data (BLOCK MAP). A journal log (JLOG2) may be stored in a second journal entry (JE2) and may represent the mapping information of the No. 1 logical address (LBA1) and the No. 1 address (VSA1).

The No. 0 logical address (LBA0) may be mapped to No. 2 address (VSA2). Write data (DATA3) corresponding to the No. 0 logical address (LBA0) may be stored in a memory block having the No. 2 address (VSA2). The value of the offset information (OFFSET) may be changed from 1 to 2. The write data (DATA1) stored in a memory block having the No. 0 address (VSA0) may be processed as invalid. Mapping information of the No. 0 logical address (LBA0) and the No. 2 address (VSA2) may be reflected in the map data (BLOCK MAP). An invalid count of No. 0 stripe (WBSTRP0) in invalid count data (INVALID COUNT ARRAY) may be changed. A journal log (JLOG3) stored in a third journal entry (JE3) may represent mapping information of the No. 0 logical address (LBA0) and the No. 2 address (VSA2).

Write data (DATA4) corresponding to No. 2 logical address (LBA2) may be stored in a memory block having No. 3 address (VSA3). Mapping information of the No. 2 logical address (LBA2) and the No. 3 address (VSA3) may be reflected in the map data (BLOCK MAP). A journal log (JLOG4) stored in a fourth journal entry (JE4) may represent mapping information of the No. 2 logical address (LBA2) and the No. 3 address (VSA3).

As described above, journaling may be performed on update information indicating map data corresponding to representative metadata, and thus, a reduction in performance caused by the journaling may be minimized and power unnecessarily consumed by a storage device may decrease.

As described above with reference to FIG. 6, when the journal logs (JLOG1 to JLOG4) corresponding to a size of the journal buffer 202a are stored in the journal buffer 202a, a checkpoint may start. When the checkpoint starts, the memory controller 100 may provide the volatile memory device 300 with a flush command which issues a command to flush updated metadata in the non-volatile storage device 200b. Also, the memory controller 100 may control the non-volatile memory device 200a to release the journal logs (JLOG1 to JLOG4) stored in the journal buffer 202a.

Figure 13:
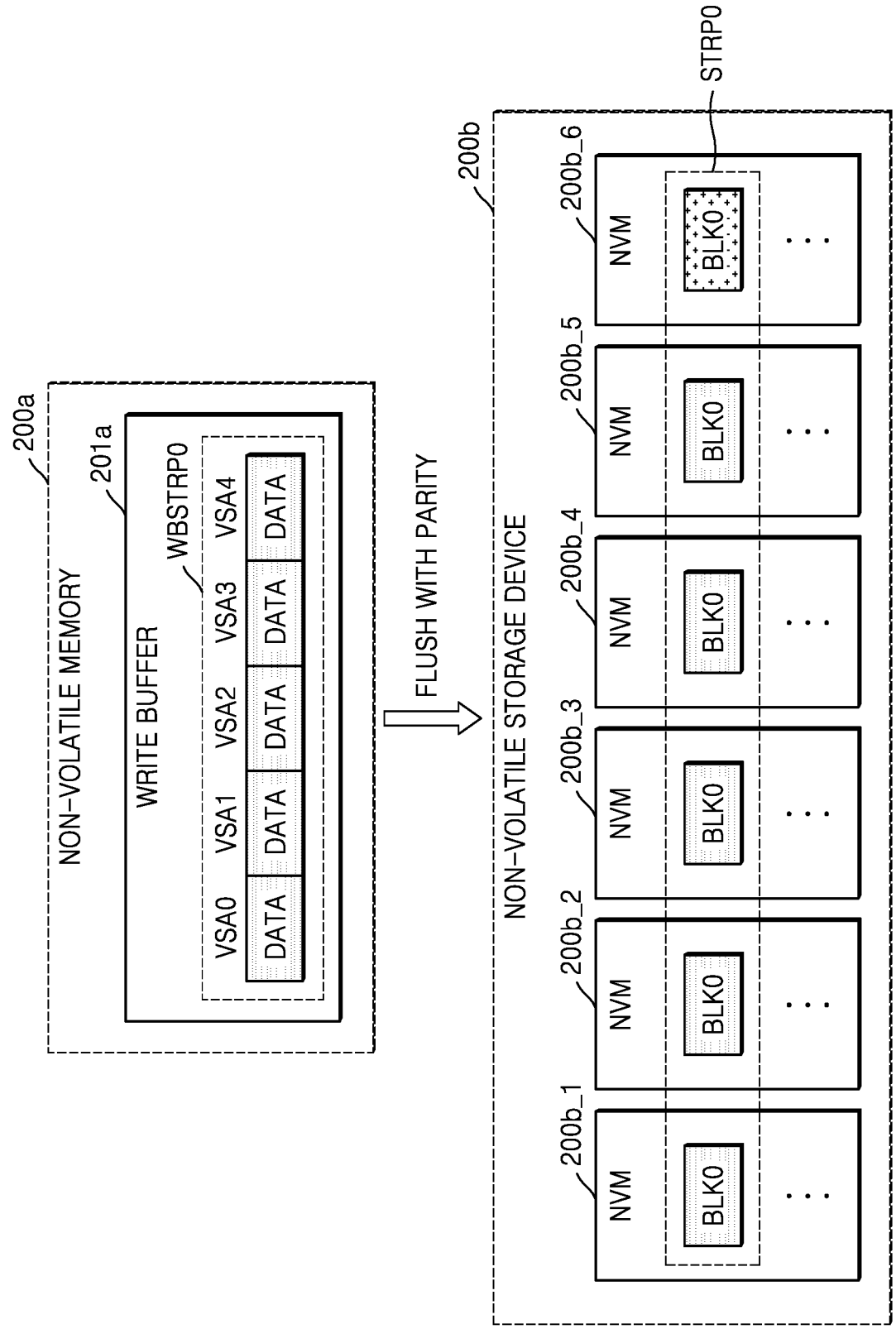
FIG. 13 is a diagram for describing an operation of flushing write data stored in a write buffer.

FIG. 13 is a diagram for describing an operation of flushing write data stored in a write buffer.

In describing an embodiment illustrated in FIG. 13, in a non-volatile storage device 200b, it may be assumed that six non-volatile storage devices 200b_1 to 200b_6 are logically operated as one non-volatile memory device, and each of the six non-volatile storage devices 200b_1 to 200b_6 is implemented as a storage device.

Referring to FIG. 13, when write data (DATA) corresponding to a size of a write buffer 201a is stored in the write buffer 201a, the memory controller 100 may control a non-volatile memory device 200a to store the write data (DATA), stored in the write buffer 201a, in a first memory block group. Here, the first memory block group may include, for example, a plurality of memory blocks (BLK0) which are included in each of five non-volatile storage devices 200b_1 to 200b_5 and are included in No. 0 stripe (STRP0).

In an embodiment, when the write data (DATA) stored in the write buffer 201a is stored in the first memory block group, the memory controller 100 may perform journaling on update information indicating mapping information of a logical address (LBA) and a physical address (PBA) of the first memory block group. Map data representing the mapping information of the logical address (LBA) and the physical address (PBA) of the first memory block group may include first map data (BLOCK MAP) and second map data (NVM STRIPE MAP). For example, journaling may be performed on update information indicating mapping information of the logical address (LBA) and a first address (VSA), and then, journaling may be performed on update information indicating mapping information of the first address (VSA) and a second address (PBA) of the first memory block group.

In an embodiment, when the write data (DATA) stored in the write buffer 201a is stored in the first memory block group, journaling may be performed on the update information indicating the mapping information of the logical address (LBA) and the first address (VSA).

The memory controller 100 may generate a parity bit (PARITY) corresponding to the write data (DATA) stored in the write buffer 201a and may control the non-volatile memory device 200a to store the parity bit (PARITY) in a second memory block group. Here, the second memory block may include, for example, a memory block (BLK0), which is included in No. 6 non-volatile memory device 200b_6 and is included in No. 0 stripe (STRP0).

Referring to FIGS. 12 and 13, when the write data (DATA) stored in the write buffer 201a is stored in the first memory block group, the second map data (NVM STRIPE MAP), the first allocation data (SEGMENT VALID BIT- MAP), and the second allocation data (STRIPE VALID BITMAP) may be updated. Also, a checkpoint may start, and the first map data (BLOCK MAP), the second map data (NVM STRIPE MAP), the first allocation data (SEGMENT VALID BITMAP), the second allocation data (STRIPE VALID BITMAP), the third allocation data (WB STRIPE VALID BITMAP), and the invalid count data (INVALID COUNT ARRAY) may be stored in the second memory block group of the non-volatile storage device 200b.

According to an embodiment illustrated in FIG. 5, a parity bit generated for each write data corresponding to a logical address may be generated each time. On the other hand, according to another embodiment illustrated in FIG. 13, write data may be preferentially stored in the write buffer 201a without a parity bit, and a parity bit corresponding to stored write data may be subsequently generated based on a memory size of the write buffer 201a. Therefore, the performance of a write operation may be improved.

In that the storage device 1000' illustrated in FIG. 10 further includes the non-volatile memory device 200a which is a physical device unlike the storage device 1000 illustrated in FIG. 1, the degree of integration of the storage device 1000 illustrated in FIG. 1 may be higher than that of the storage device 1000' illustrated in FIG. 10.

Figure 14:
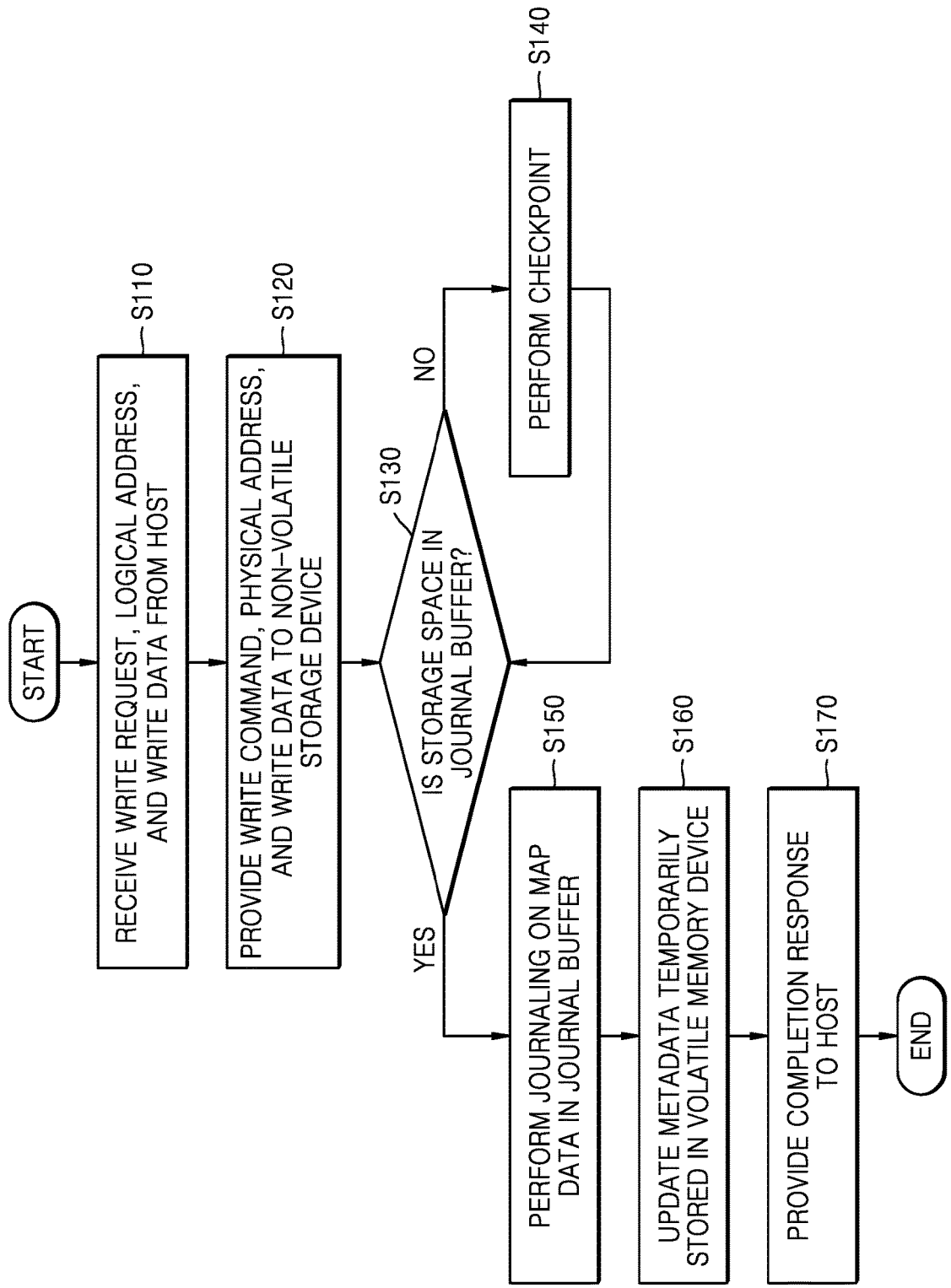
FIG. 14 is a flowchart for describing a first operating method of a memory controller.

FIG. 14 is a flowchart for describing a first operating method of a memory controller.

Referring to FIG. 14, in operation S110, the memory controller 100 may receive a write request, a logical address, and write data from the host 2000. A description thereof may be the same as description given above with reference to FIG. 5 or FIG. 12.

In operation S120, the memory controller 100 may provide a write command, a physical address, and the write data to the non-volatile storage device 200. A description thereof may be the same as description given above with reference to FIG. 5 or FIG. 12.

In operation S130, the memory controller 100 may monitor whether a storage space is in a journal buffer. Here, the journal buffer may be the second memory region 201 described above with reference to FIG. 3 or the physical journal buffer 202a described above with reference to FIG. 10.

When a storage space where a journal log is to be stored is in the journal buffer in operation S130 (No), the memory controller 100 may perform a checkpoint in operation S140. A description thereof may be the same as description given above with reference to FIG. 6.

When the storage space where the journal log is to be stored is in the journal buffer in operation S130 (Yes), the memory controller 100 may perform journaling on map data in the journal buffer in operation S150. A description thereof may be the same as description given above with reference to FIG. 5 or FIG. 12.

In operation S160, the memory controller 100 may update metadata, which is temporarily stored in the volatile memory device 300. A description thereof may be the same as description given above with reference to FIG. 5 or FIG. 12.

In operation S170, the memory controller 100 may provide the host 2000 with a response to the write request.

Figure 15:
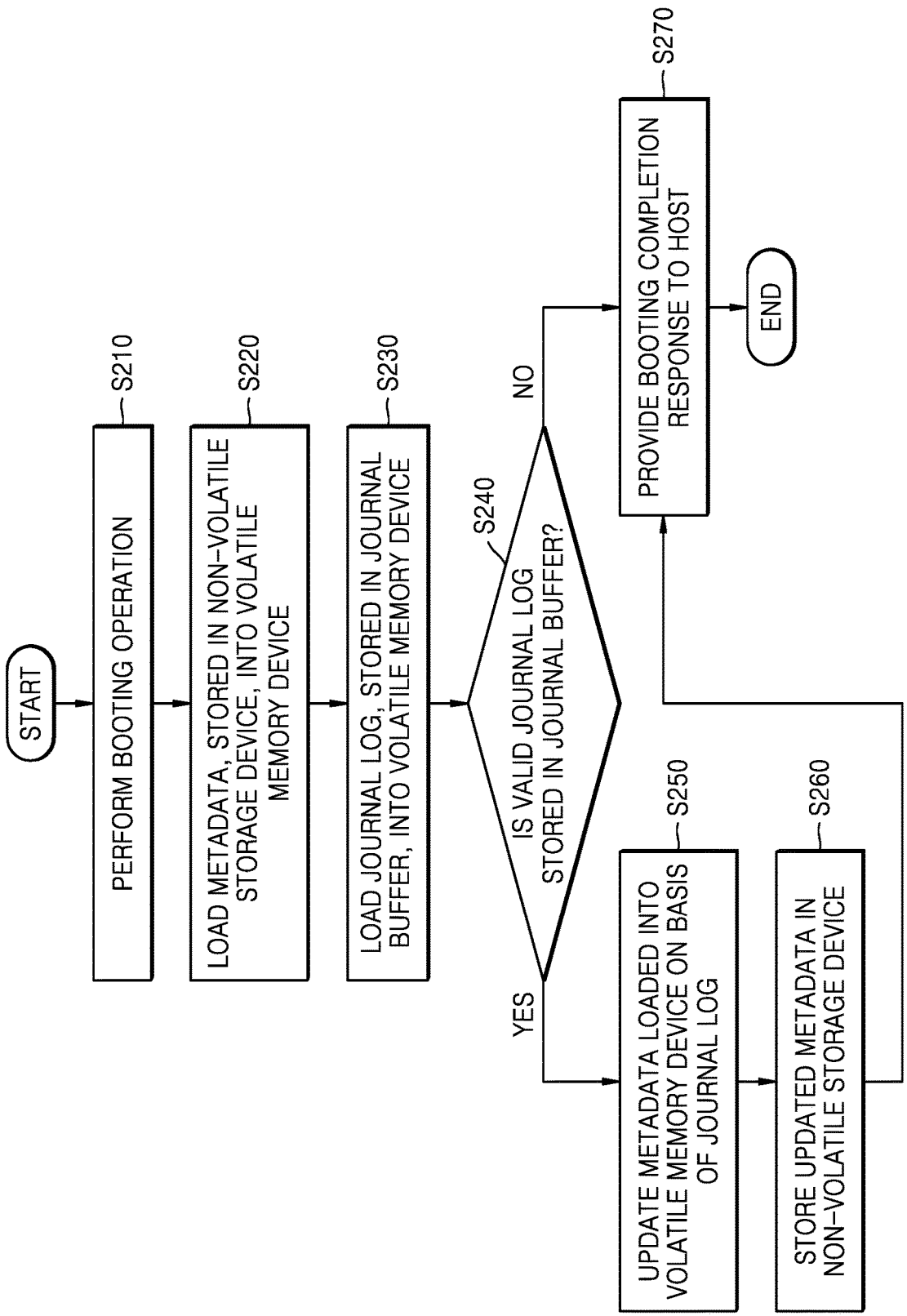
FIG. 15 is a flowchart for describing a second operating method of a memory controller.

FIG. 15 is a flowchart for describing a second operating method of a memory controller.

Referring to FIG. 15, in operation S210, the memory controller 100 may perform a booting operation in response to power, from the outside of the storage device 1000', being supplied to the storage device 1000'.

In operation S220, the memory controller 100 may load metadata, stored in the non-volatile storage device 200, into the volatile memory device 300. A description thereof may be the same as description given above with reference to FIG. 8.

In operation S230, the memory controller 100 may load a journal log, stored in the journal buffer, into the volatile memory device 300. In an embodiment, the memory controller 100 may load the journal log into the volatile memory device 300 in response to a request of a user. A description thereof may be the same as description given above with reference to FIG. 8.

In operation S240, the memory controller 100 may check whether a valid journal log is stored in the journal buffer. A description thereof may be the same as description given above with reference to FIG. 8.

When the valid journal log is stored in the journal buffer in operation S240 (Yes), the memory controller 100 may update the metadata loaded into the volatile memory device 300 on the basis of the journal log in operation S250.

In an embodiment, when a plurality of memory blocks included in the non-volatile storage device 200 are grouped by stripe units, and a physical address of a memory block storing write data includes stripe information and offset information, and the offset information is information indicating a number of a first memory block, the memory controller 100 may generate the second allocation data (STRIPE VALID BITMAP) representing that a stripe is allocated.

In an embodiment, when a plurality of stripes are grouped by predetermined segment units and the stripe information is information indicating a number of a first stripe included in each segment, the memory controller 100 may generate the first allocation data (SEGMENT VALID BITMAP) representing that a segment including a stripe corresponding to stripe information is allocated.

In an embodiment, as described above with reference to FIG. 9, the journal log may include a first journal log, representing first mapping information of a first logical address and a first physical address, and a second journal log which represents second mapping information of the first logical address and a second physical address and is stored later in time than the first journal log. In this case, the memory controller 100 may first generate first map data representing the first mapping information on the basis of the first journal log. Also, after the first map data is generated, the memory controller 100 may convert the first map data into second map data on the basis of the second journal log. Here, the second map data may be data representing the second mapping information. In this case, the metadata may further include invalid count data, and in response to generating the second map data, the memory controller 100 may generate invalid count data where an invalid count corresponding to a memory block having the first physical address has increased.

In operation S260, the memory controller 100 may store updated metadata in the non-volatile storage device 200. A description thereof may be the same as description given above with reference to FIGS. 8 and 9.

When the valid journal log is not stored in the journal buffer in operation S240 (No), a booting completion response may be provided to the host 2000 in operation S270.

As described above, even when an unexpected event such as sudden power off occurs, consistency between metadata and a journal log may be ensured, and the reliability of a storage device may be improved.

While the inventive concept has been particularly shown and described with reference to embodiments thereof, it will be understood that various changes in form and details may be made therein without departing from the spirit and scope of the following claims.

What is claimed is:

1. A storage device comprising:
   a non-volatile memory device including a write buffer configured to store write data provided from a host and a journal buffer configured to store a journal log, the journal log being data representing update information indicating mapping information of a physical address and a logical address provided from the host and includes a first journal log representing first mapping information of a first logical address and a first physical address, and a second journal log which represents second mapping information of the first logical address and a second physical address and is stored later than the first journal;
   a volatile memory device configured to temporarily store metadata; and
   a memory controller configured to
      store the write data into the write buffer,
      provide the non-volatile memory device with the journal log and the physical address corresponding to the journal buffer to store the journal log, and a journaling command which issues a command to store the journal log in the journal buffer, in response to storing the write data into the write buffer,
      update the metadata temporarily stored in the volatile memory device on the basis of the journal log,
      control the volatile memory device to store updated metadata, as first metadata, to the volatile memory device, and
      generate second metadata,
      wherein generating the second metadata comprises
         generating first map data representing the first mapping information on the basis of the first journal log; and
         after the first map data is generated, converting the first map data into second map data representing the second mapping information on the basis of the second journal log.

2. The storage device of claim 1, further comprising a non-volatile storage device including a first memory block group and a second memory block group.

3. The storage device of claim 2, wherein, when write data corresponding to a size of the write buffer is stored in the write buffer, the memory controller is configured to store the write data, stored in the write buffer, in the first memory block group.

4. The storage device of claim 3, wherein the memory controller is configured to generate a parity bit corresponding to the write data stored in the write buffer and to control the non-volatile memory device to store the parity bit in the second memory block group.

5. The storage device of claim 2, wherein the first metadata comprises first map data representing mapping information of the logical address and a first address of the write buffer, second map data representing mapping information of the first address of the write buffer and a second address of the first memory block group, first allocation data representing information about an allocated storage space in the write buffer, second allocation data representing information about an allocated storage space in the first memory block group, and invalid count data representing the number of times a memory block is processed as invalid in the first memory block group.

6. The storage device of claim 5, wherein the memory controller is configured to control the non-volatile memory device to store, as the journal log, update information indicating the mapping information of the first address and the second address in the journal buffer.

7. The storage device of claim 3, wherein, in response to storing the write data, stored in the write buffer, in the first memory block group, the memory controller is configured to control the non-volatile memory device to store, as the journal log, update information indicating mapping information of the logical address and a physical address of the first memory block group in the journal buffer.

8. The storage device of claim 3, wherein, when a journal log corresponding to a size of the journal buffer is stored in the journal buffer, the memory controller is configured to provide the volatile memory device with a flush command, which issues a command to flush the updated metadata to the non-volatile storage device.

9. The storage device of claim 8, wherein the memory controller is configured to control the non-volatile memory device to release the journal log stored in the journal buffer.

10. A storage device comprising:
    a non-volatile storage device including a first memory region configured to store write data provided from a host, a second memory region configured to store a journal log, and a third memory region configured to store metadata of the write data, the journal log being data representing update information indicating mapping information of a physical address of the first memory region and a logical address provided from the host and includes a first journal log representing first mapping information of a first logical address and a first physical address, and a second journal log which represents second mapping information of the first logical address and a second physical address and is stored later than the first journal;
    a volatile memory device configured to temporarily store the metadata; and
    a memory controller configured to
       store the write data into a write buffer,
       provide the non-volatile storage device with a first journaling command, that includes the journal log and the physical address corresponding to the second memory region, and which issues a command to store the journal log, in response to storing the write data into the write buffer,
       update the metadata temporarily stored in the volatile memory device,
       control the volatile memory device to store updated metadata, as first metadata, to the volatile storage device, and
       generate second metadata,
       wherein generating the second metadata comprises
          generating first map data representing the first mapping information on the basis of the first journal log; and
          after the first map data is generated, converting the first map data into second map data representing the second mapping information on the basis of the second journal log.

11. The storage device of claim 10, wherein, when a journal log corresponding to a size of the second memory region is stored in the second memory region, the memory controller is configured to provide the volatile memory device with a flush command, which issues a command to flush the updated metadata to the non-volatile storage device.

12. The storage device of claim 11, wherein the memory controller is configured to provide the non-volatile storage device with a second journaling command, which issues a command to erase the journal log.

13. The storage device of claim 10, wherein the first memory region comprises one or more segments logically configured with a plurality of stripes,
each of the plurality of stripes is a logical group where a plurality of memory blocks included in the non-volatile storage device operate as one memory block, and
the first metadata comprises map data representing the mapping information, first allocation data representing the allocation or not of each of the one or more segments, and second allocation data representing the allocation or not of each of the plurality of stripes.

14. The storage device of claim 13, wherein the first metadata further comprises invalid count data representing the number of times data is processed as invalid.

15. An operating method of a memory controller included in a storage device having a non-volatile storage device, the operating method comprising:
receiving, by the memory controller, first metadata and a journal log stored in the non-volatile storage device in response to power supplied to the storage device, the journal log being data representing update information indicating mapping information of a logical address provided from a host and a physical address of a memory block storing write data among a plurality of memory blocks included in the non-volatile storage device;
generating, by the memory controller, second metadata including map data representing the mapping information and allocation data representing information indicating an allocated memory region in the non-volatile storage device, on the basis of the journal log; and
providing, by the memory controller, the non-volatile storage device with a write command that includes a command to store the second metadata, a physical address of a memory block storing metadata among the plurality of memory blocks, and the second metadata,
wherein the journal log comprises a first journal log, representing first mapping information of a first logical address and a first physical address, and a second journal log which represents second mapping information of the first logical address and a second physical address and is stored later than the first journal log, and
the generating of the second metadata comprises:
generating first map data representing the first mapping information on the basis of the first journal log; and
after the first map data is generated, converting the first map data into second map data representing the second mapping information on the basis of the second journal log.

16. The operating method of claim 15, wherein the memory region comprises a predetermined number of segments grouped in a stripe which is a logical group where a plurality of memory blocks included in the non-volatile storage device operate as one memory block, and
the physical address of the memory block storing the write data comprises stripe information indicating a number of the stripe and offset information indicating a number of a memory block, where write data provided from the host was previously last stored, of a plurality of memory blocks included in the stripe.

17. The operating method of claim 16, wherein the offset information comprises information indicating a number of a first memory block, and
the generating of the second metadata comprises generating data, representing that the stripe is allocated, as the allocation data.

18. The operating method of claim 17, wherein the stripe information comprises information indicating a number of a first stripe included in each segment, and
the generating of the second metadata comprises generating, as the allocation data, data representing that a segment including a stripe corresponding to the stripe information among the segments is allocated.

19. The operating method of claim 15, wherein the second metadata further comprises invalid count data representing the number of times data is processed as invalid, and
the generating of the second metadata comprises, in response to generating the second map data, generating invalid count data where an invalid count corresponding to a memory block having a first physical address has increased.

* * * * *